United States Patent [19]
Miyano

[11] Patent Number: 5,659,357
[45] Date of Patent: Aug. 19, 1997

[54] AUTO WHITE ADJUSTING DEVICE

[75] Inventor: Toshiki Miyano, Yokohama, Japan

[73] Assignee: Eastman Kodak Company, Rochester, N.Y.

[21] Appl. No.: 595,056

[22] Filed: Feb. 1, 1996

[30] Foreign Application Priority Data

Apr. 13, 1995 [JP] Japan ................................. 7-087846

[51] Int. Cl.⁶ ............................................. H04N 9/73
[52] U.S. Cl. ........................ 348/223; 348/227; 348/655
[58] Field of Search ............................. 348/223, 224, 348/225, 227, 655; H04N 9/73, 9/64

[56] References Cited

U.S. PATENT DOCUMENTS

| | | | |
|---|---|---|---|
| 5,319,449 | 6/1994 | Saito et al. | 348/223 |
| 5,485,202 | 1/1996 | Ueda | 348/223 |
| 5,489,939 | 2/1996 | Haruki et al. | 348/223 |

FOREIGN PATENT DOCUMENTS

| | | | |
|---|---|---|---|
| 90693 | 7/1989 | Japan | H04N 9/73 |
| 272892 | 7/1990 | Japan | H04N 9/73 |
| 37952 | 3/1991 | Japan | H04N 9/73 |
| 5-292533 | 4/1992 | Japan | H04N 9/73 |

*Primary Examiner*—Glenton B. Burgess
*Attorney, Agent, or Firm*—David M. Woods

[57] ABSTRACT

The present invention provides an auto white balance adjusting device which can appropriately adjust the white balance. A brightest block searching circuit (8) obtains blocks having block representative values, each R,G,B component of which is greater than a respective predetermined threshold value, and selects the brightest one out of the obtained blocks. A brightest block average value calculating circuit (9) obtains an average of the block representative values distributed in the image signal area of a chromaticity near to that of the brightest block. This brightest block average value is thought to be highly influenced by a predominant light source in taking the picture. The white balance can be appropriately adjusted by using this value, irrespective of the kinds of light sources.

11 Claims, 14 Drawing Sheets

FIG. 2
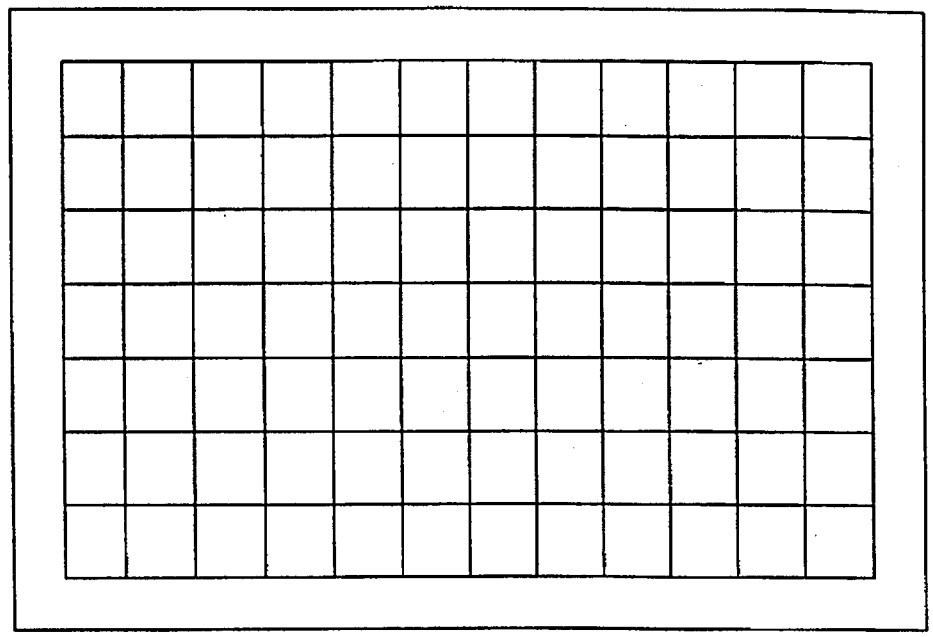
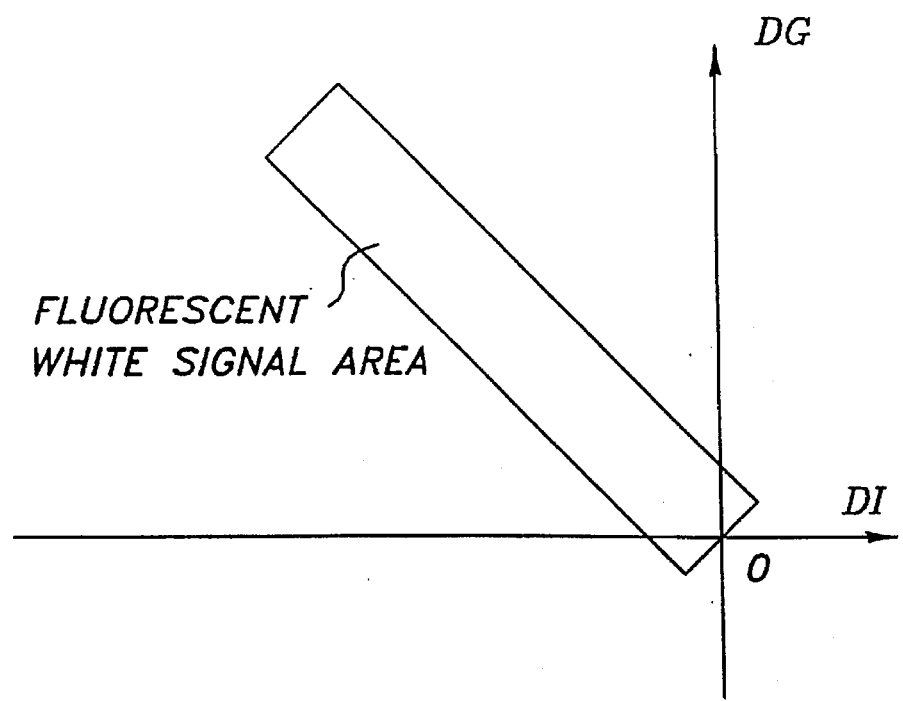
FIG. 3

SOLAR AND TUNGSTEN WHITE AREA

BRIGHTEST BLOCK AREA (DI_BR, DG_BR)

AUTO WHITE ADJUSTING DEVICE

FIELD OF THE INVENTION

The present invention relates to an auto white balance device used in a camera, such as an electronic still camera and a video camera.

BACKGROUND OF THE INVENTION

Auto white balance adjusting serves in an electronic still camera or a video camera to reproduce whiteness in an image of a white subject. In a current auto white balance adjusting system, the balance of the RGB components of each pixel signal is adjusted so that an average of the signals totally represents an achromatic color. When an image, most of which is composed of chromatic colors, is treated using this white balance adjusting system, an error in white balance adjusting, called color failure, easily occurs. Several white balance adjusting systems in which the color failure can be prevented have been proposed. Japanese Patent Laid-Open Publication No. Hei 5-292533 discloses a white balance adjusting system with a color failure preventing function. In this system, a screen is divided into a plurality of blocks. A representative value for each block of the image signal is obtained. An average of the representative values for the blocks belonging to a predetermined area of the screen is calculated. A white balance adjusting signal which represents an achromatic color in compensation for the average is obtained. The color failure can be prevented when the white balance adjusting based on this white balance adjusting signal is carried out. Japanese Patent Laid-Open Publication No. Hei 5-7369 discloses another white balance adjusting system. In this system, the range in which the white balance adjusting signal varies is limited. Overadjusting of the white balance can be prevented when the white balance adjusting based on this limited white balance adjusting signal is carried out.

A greenish image is usually reproduced for a white subject when a white subject is illuminated with a fluorescent lamp in a room. It is difficult to discriminate the greenish image from a green image of grass illuminated with sunlight outdoors. These images easily suffer the color failure. A video camera and electronic still camera are thought to be often used indoors in light from a fluorescent lamp or outdoors for taking pictures with a background of grass. The easy occurrence of color failure is undesirable. In the white balance adjusting system of Japanese Patent Laid-Open Publication No. Hei 5-7369 described before, it is determined by the luminance of a subject whether the subject is located outdoors or indoors. The range in which the white balance adjusting signal varies is set corresponding to the respective conditions to restrain the color failure.

The above described white balance adjusting system can appropriately adjust the white balance for the subject irradiated by predetermined light sources such as the sun, and light from fluorescent and tungsten lamps, but often cannot appropriately adjust for a subject irradiated simultaneously by a plurality of light sources or by an unidentified light source.

Although various improvements are made in the current white balance adjusting systems to prevent the color failure, the color failure occasionally occurs in adjusting the white balance for a chromatic image occupying a large part of a screen.

The subject to be imaged determines the necessity of the white balance adjusting. For example, in taking pictures in a sunset, the sky itself is properly imaged without the white balance adjusting, whereas subjects except the sky in the sunset are properly imaged using the white balance adjusting. However, the current auto white balance systems automatically operate, irrespective of the subjects to be imaged.

SUMMARY OF THE INVENTION

In order to solve the above problems, the present invention provides a device for appropriately adjusting the white balance of an image of the subject irradiated by a plurality of light sources or by an unidentified light source.

The present invention further provides an auto white balance adjusting device for appropriately adjusting the white balance of a chromatic image occupying a large part of a screen.

The present invention further provides an auto white balance adjusting device for appropriately adjusting the white balance of an image taken in a sunset.

An auto white balance adjusting device provided by the present invention comprises a block representative value calculating circuit for dividing an input image signal into blocks, and for obtaining a block representative value of the respective blocks representing the image signal, a brightest block searching circuit for searching the blocks having the representative values the respective R, G, B components of which are greater than predetermined threshold R, G, B values, and for determining a block having the brightest luminance among the searched blocks as the brightest block, a brightest block average value calculating circuit for obtaining a brightest block signal area, based on the block representative value of the brightest block determined by the brightest block detecting circuit, for selecting block representative values belonging to the blocks of the brightest block signal area, for obtaining the number of the selected block representative values as the number of the brightest blocks, and for obtaining the average value of the selected block representative values as a brightest block average value, a fluorescent lamp block average value calculating circuit for obtaining a fluorescent lamp white signal area, for selecting block representative values of the blocks belonging to the fluorescent lamp white signal area, for obtaining the number of the selected block representative values as the number of fluorescent lamp blocks, and for obtaining the average value of the selected block representative values as a fluorescent lamp block average value, a solar/tungsten light block average value calculating circuit for obtaining a solar/tungsten light white signal area, for selecting block representative values of the blocks belonging to the solar/tungsten light white signal area, for obtaining the number of the determined block representative values as the number of the solar/tungsten light blocks, and for obtaining the average value of the determined block representative values as the solar/tungsten light block average value, a brightest block weighting circuit for determining a brightest block weighting factor based on the brightest block average value through a predetermined procedure, and for obtaining a weighted brightest block average value by multiplying the brightest block average value by the brightest block weighting factor, a fluorescent lamp block weighting circuit for determining a fluorescent lamp block weighting factor, based on at least one of the fluorescent lamp block average value or a subject luminance, and for obtaining a weighted fluorescent lamp block average value by multiplying the fluorescent lamp block average value by the fluorescent lamp block weighting factor, a solar and tungsten light block weighting circuit for determining a solar/tungsten light block weighting factor based on the solar and tungsten light block average value through a predetermined procedure, and for obtaining a weighted solar/tungsten light block average value by multiplying the solar/tungsten light block average value by the solar and tungsten light block weighting factor, a white balance adjusting signal calculating circuit for generating a white balance adjusting signal by combining the weighted brightest block average value, the weighted fluorescent lamp block average value and the weighted solar/tungsten light block average value proportionally to the ratio of the numbers of the blocks each number of which is weighted by the respective weighting factors, and a white balance adjusting circuit for adjusting the white balance of an image signal using the white balance adjusting signal.

In the auto white balance adjusting device provided by the present invention, the blocks having block representative values each R,G,B components of which is greater than respective predetermined threshold values are obtained, and the brightest one are selected out of the obtained blocks. The information of the brightest block is used for adjusting the white balance.

The chromaticity of the brightest block is influenced by a predominant light source in taking the picture. In the present invention, the brightest block average value calculating circuit obtains an average of the block representative values distributed in the image signal area of a chromaticity near to that of the brightest block (brightest block average value). This is utilized in the white balance adjusting. In the present invention, the fluorescent lamp block average value and solar/tungsten light block average value are obtained to adjust the white balance considering the influence of illumination by a fluorescent lamp or solar/tungsten light. The brightest block weighting circuit, fluorescent lamp block weighting circuit and solar/tungsten light block weighting circuit obtain the brightest block weighting factor, fluorescent lamp block weighting factor and solar/tungsten light block factor, and calculate the weighted brightest block average value, weighted fluorescent lamp block average value and weighted solar/tungsten light block average value, respectively. The white balance adjusting signal calculating circuit obtains the white balance adjusting signal based on the respective weighted average values and the numbers of blocks included in the corresponding image signal areas.

In the present invention, the brightest block average value is used as a parameter in calculating the white balance adjusting signal. This enables white balance adjusting appropriate to the light source even when the subject to be imaged is irradiated by sunlight or light of a fluorescent lamp as well as simultaneously by a plurality of light sources or by an unidentified light source.

An auto white balance adjusting device provided by the present invention has a uniformity calculating circuit for calculating a uniformity of respective groups into which all blocks are divided based on the block representative values of the blocks belonging to each group and a uniform block eliminating circuit for obtaining a substantially uniform group by comparing the uniformities of the groups outputted from the uniformity calculating circuit with a predetermined threshold value and for preventing the block representative values of the blocks belonging to the substantially uniform group from being inputted to the block average value calculating circuit from the block representative value calculating circuit. A white balance adjusting signal is obtained based on the block representative values of the blocks belonging to the groups except the substantially uniform groups.

In accordance with this aspect of the present invention, all blocks of an image signal is divided into a plurality of groups and the uniformity value of the respective groups is obtained by the uniformity calculating circuit. It is judged whether the image within the group is approximately uniform using the uniformity. The block representative values of the blocks belonging to the group judged to be substantially uniform are prevented by the uniform block eliminating circuit from being inputted to the block average value calculating circuit. This prevents the color failure for a chromatic image occupying a large part of a screen because the white balance adjusting is not operated for the chromatic image.

An auto white balance adjusting device provided by the present invention has a uniformity calculating circuit for calculating a uniformity of the respective groups into which all blocks are divided based on the block representative values of the blocks of each group, a brightest uniform block weighting circuit for weighting the block representative values outputted from the block representative value calculating circuit with a brightest block weighting factor determined through a predetermined procedure depending on the uniformity and for outputting a weighted block representative value to the brightest block average value calculating circuit, a fluorescent lamp uniform block weighting circuit for weighting the block representative values outputted from the block representative value calculating circuit with a fluorescent lamp block weighting factor determined through a predetermined procedure depending on the uniformity and for outputting a weighted block representative value to a fluorescent lamp block average value calculating circuit and a solar/tungsten light uniform block weighting circuit for weighting the block representative values outputted from the block representative value calculating circuit with a solar/tungsten light uniform block weighting factor determined through a predetermined procedure depending on the uniformity and for outputting a weighted block representative value to the solar/tungsten light block average value calculating circuit. The brightest block average value, fluorescent lamp block average value and solar/tungsten light block average value are obtained by the block average value calculating circuit using the weighted block representative values outputted from the respective uniform block weighting circuits.

According to this aspect of the present invention, the block representative value is weighted by a uniform block weighting factor which is determined depending on the uniformity of the block to which the block belongs before inputting the block representative value of the block to the respective block average value calculating circuits. In this aspect, the more uniform the block is, the smaller block weighting factor is given to the block. This allows the contribution of a more uniform group to the white balance adjusting signal to be smaller in order to achieve precise white balance adjusting preventing the color failure for chromatic images.

An auto white balance adjusting device provided by the present invention has a solar light block number counting circuit for obtaining the number of blocks the block representative values of which are included in a solar light white signal area, a tungsten light block number counting circuit for obtaining the number of blocks the block representative values of which are included in a tungsten light white signal area and a sunset image determining circuit for determining whether the image signal is derived from a sunset. The sunset image determining circuit has an region uniformity calculating section to which the uniformities of the groups are inputted, and by which an upper uniformity is obtained using the inputted uniformities in a predetermined upper region of the screen, a right uniformity in a predetermined right region of the screen and a left uniformity in a predetermined left region of the screen, a sky image detecting section for comparing the upper, right and left uniformities with a predetermined threshold value, and for determining that most of the image of the input signal shows the sky when at least one of the upper, right and left regions is found to be substantially uniform, a first block number comparing section for comparing the number of blocks inputted from the solar/tungsten light block average value calculating circuit with the number of blocks inputted from the fluorescent light block average value calculating circuit, a second block number comparing section for comparing the number of the solar light blocks with the number of the tungsten light blocks, a sunset image detecting section for determining whether the image signal is derived from the sky in a sunset, and for outputting a sunset determining signal to the solar/tungsten light block weighting circuit and the brightest block weighting circuit when the image is found to be derived from the sky by the sky image detecting section, the number of the tungsten light blocks is found to be larger by the comparison in the first block number comparing section and the solar block number is found to be larger by the comparison in the second comparing section. The solar/tungsten light block weighting circuit changes the solar/tungsten light block weighting factor according to a predetermined rule when the sunset determining signal is inputted. The brightest block weighting circuit generates different weighting factors when the brightest block average value is near the area of the fluorescent light white signal area or near the solar/tungsten light white signal area.

According to this aspect of the present invention, the sunset determining circuit determined whether the image signal is derived mainly from the sky in a sunset. The white balance adjusting is changed according to the determination. In this aspect, the sunset image detecting section determines whether the image signal is derived mainly from the sky in a sunset according to the results obtained from the sky image detecting section and the first and second block number comparing sections. The image signal is judged by the sunset image detecting section to be derived from the sky in a sunset when most of the screen is close to uniform and the number of the blocks belonging to the region indicating nearly white in sunlight (the solar light white signal area) is larger. When the image signal is found to be derived mainly from the sky in a sunset, the solar/tungsten light block weighting circuit changes the solar/tungsten light weighting factor to prevent the effect of sunlight on the weighting factor from being decreased. The brightest block weighting factor is also adjusted to prevent the effect of sunlight on the brightest block weighting factor from being decreased when the image signal is derived only from the sky in a sunset.

In another aspect of the present invention, a signal indicating the direction of the ground is inputted to the sky image detecting section by means for inputting the direction of the ground. The sky image detecting section specifies the direction of the sky using the inputted signal of the direction of the ground. The sky image detecting section only investigates the image located in a sky area of the screen and determines whether the image is substantially uniform. This enables more rapid and precise determination of whether a portion of the image signal which shows the sky is large within the image signal.

BRIEF DESCRIPTION OF THE DRAWINGS

FIG. 2 represents a division of the screen into blocks according to an embodiment of the present invention.

FIG. 3 shows a fluorescent lamp white signal area in the DG-DI plane.

DESCRIPTION OF THE PREFERRED EMBODIMENTS

Figure 1:
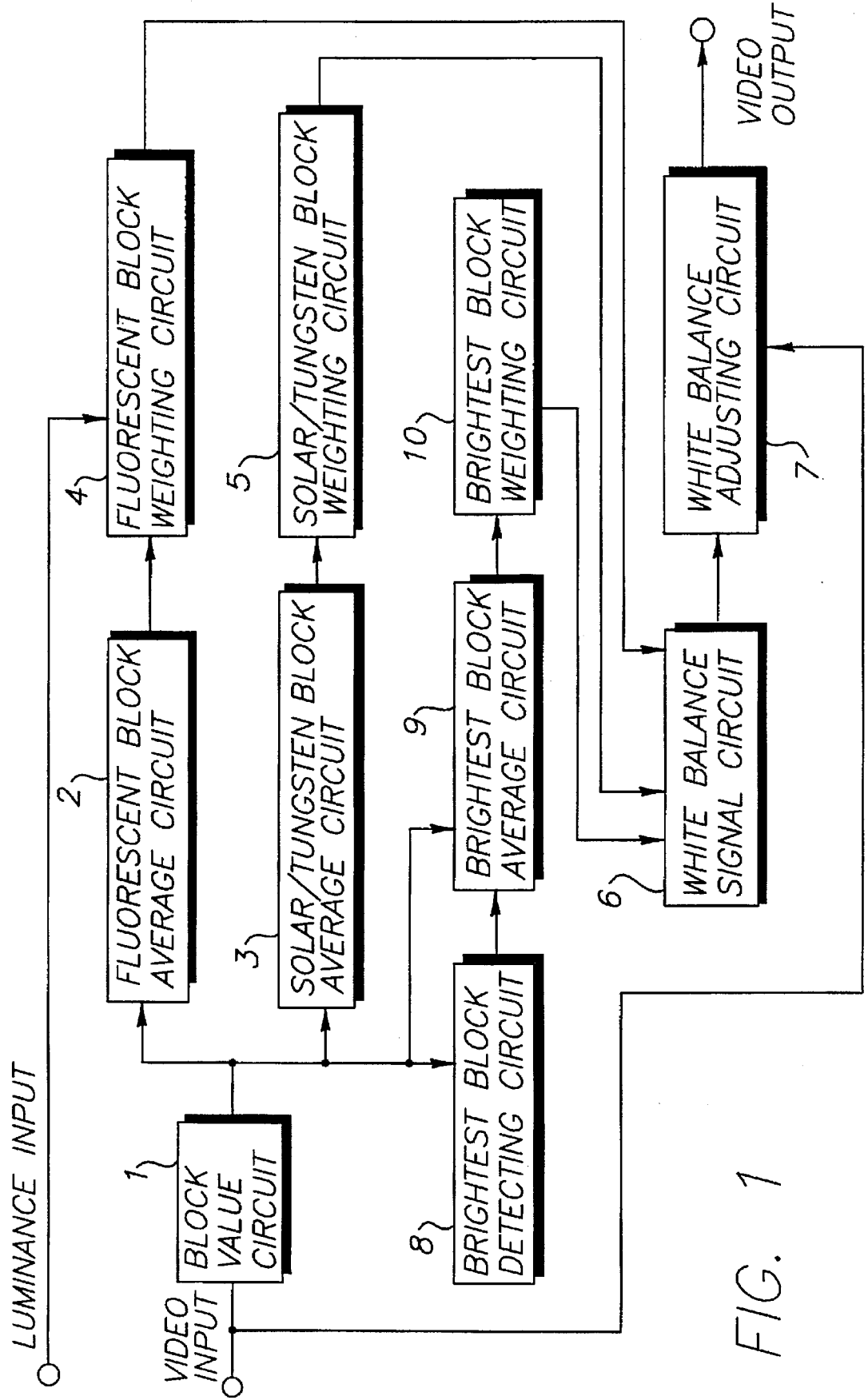
FIG. 1 shows a block diagram of an auto white balance adjusting device according to the first embodiment of the present invention.

FIG. 1 shows a block diagram of an auto white balance adjusting device according to the first embodiment of the present invention. In a block representative value calculating circuit 1, an image signal inputted from an image signal input terminal is divided into a plurality of blocks. The blocks have a square shape and are regularly arranged according to a dividing method. The block representative value calculating circuit 1 obtains a value of the image signal included in the respective divided blocks as a block representative value. The method for obtaining the block representative value is described later in detail. In a fluorescent lamp block average value calculating circuit 2, block representative values included in a fluorescent lamp white signal area are selected from among the block representative values obtained by the block representative value calculating circuit 1, and an average value and the number of the selected block representative values are obtained as a fluorescent lamp block average value and the number of fluorescent lamp blocks, respectively. The fluorescent lamp white signal area is defined as follows: An area around which the image signals from white subjects irradiated by a fluorescent lamp are distributed is defined as the fluorescent lamp white signal area. This fluorescent lamp white signal area can be expressed in a color-difference signal plane. An example of the fluorescent lamp white signal area is described later in detail in the explanation of the operation of an auto white balance adjusting device provided by this embodiment. The fluorescent lamp block average value calculating circuit 2 counts the number of the selected block representative values to obtain the number of blocks the representative values of which are included in the fluorescent lamp white signal area (the number of fluorescent lamp blocks).

A solar/tungsten light block average value calculating circuit 3 selects the block representative values belonging to a solar/tungsten light white signal area from among all the block representative values, and obtains an average value of the selected block representative values (a solar/tungsten light block average value) and the number of the selected blocks (the number of the solar/tungsten light blocks). The solar/tungsten light white signal area is defined as follows: An area around which the image signals from white subjects irradiated by sunlight or light of a tungsten lamp are distributed is defined as the solar/tungsten light white signal area. An example of the solar/tungsten light white signal area is described later in detail in the explanation of the operation of an auto white balance adjusting device provided by this embodiment.

A subject luminance is inputted from a subject luminance input terminal of a fluorescent lamp block weighting circuit 4 simultaneously when the fluorescent lamp block average value and the number of the fluorescent lamp blocks are inputted to the fluorescent lamp block weighting circuit 4 from the fluorescent lamp block average value calculating circuit 2. The fluorescent lamp block weighting circuit 4 calculates a fluorescent lamp block weighting factor based on the inputted data, multiplies the fluorescent lamp block average value and the number of the fluorescent lamp blocks by the fluorescent lamp block weighting factor to obtain a weighted fluorescent lamp block average value and a weighted number of the fluorescent lamp blocks.

A solar/tungsten light block weighting circuit 5 calculates a solar/tungsten light weighting factor based on the solar/tungsten light block average value inputted from the solar/tungsten light block average value calculating circuit 3 through a predetermined procedure, and multiplies the solar/tungsten light block average value and the number of the solar/tungsten light blocks by the solar/tungsten light weighting factor to obtain a weighted solar/tungsten light block average value and a weighted number of the solar/tungsten light blocks.

The above explained circuits of the fluorescent lamp block average value calculating circuit 2, the solar/tungsten light block average value calculating circuit 3, the fluorescent lamp block weighting circuit 4 and the solar/tungsten light block weighting circuit 5 enable appropriate white balance adjusting in the fluorescent lamp light and solar/tungsten light.

In this embodiment, the components which enable appropriate white balance adjusting for subjects irradiated by light sources (illuminations) other than definite fluorescent lamp, solar and tungsten lights are additionally utilized. The components are a brightest block searching circuit 8, a brightest block average value calculating circuit 9 and a brightest block weighting circuit 10.

The brightest block searching circuit 8 selects the brightest block of all the blocks in the image signal. The brightest block has the highest luminance of the blocks among which the R, G and B components of the block representative value indicate respective predetermined R, G and B threshold values or more. The brightest block searching circuit 8 outputs the representative value of the brightest block (the brightest block representative value).

The brightest block average value calculating circuit 9 obtains a brightest block signal area based on the brightest block representative value inputted from the brightest block searching circuit 8. An area around which the brightest block representative values of a predetermined color are distributed is defined as the brightest block signal area. An example of the brightest block signal area is explained later in detail. The brightest block average value calculating circuit 9 selects the block representative values included in the brightest block signal area from among the block representative values inputted from the block representative value calculating circuit 1, and obtains an average value of the selected block representative values (a brightest block average value) and the number of the selected blocks (the number of the brightest blocks).

The brightest block average value and the number of the brightest blocks are inputted to a brightest block weighting circuit 10 from the brightest block average value calculating circuit 9. The brightest block weighting circuit 10 obtains a brightest block weighting factor based on the brightest block average value, and multiplies the brightest block average value and the number of the brightest blocks by the brightest block weighting factor to obtain a weighted brightest block average value and a weighted number of the brightest blocks.

A white balance adjusting signal calculating circuit 6 calculates a white balance adjusting signal based on the weighted values obtained by the fluorescent lamp block weighting circuit 4, the solar/tungsten light block weighting circuit 5 and the brightest block weighting circuit 10 obtain the respective weighted values.

The white balance adjusting signal calculating circuit 6 combines the weighted block average values proportionally to the ratio of the weighted numbers of the fluorescent lamp, solar/tungsten light and brightest blocks, and obtains the white balance adjusting signal based on the combined value.

A white balance adjusting circuit 7 adjusts the image signal through the white balance adjusting signal. The image signal white-balance-adjusted by the white balance adjusting circuit 7 is outputted from an image signal output terminal.

The white balance is adjusted in the above-structured auto white balance adjusting device according to the following procedure:

At the first stage, an image signal (R, G, B) is inputted to the block representative value calculating circuit 1 from its input terminal. As shown in FIG. 2, the image signal is divided into a plurality of blocks by the block representative value calculating circuit 1, then block representative values of the respective divided blocks are obtained. For instance, an average value of the signals from all pixels (R, G, B) in the block is used as the representative value. An average value of the signals from the pixels sampled in the block, that from all pixels in a part of the block and a median or a mode of the image signal of the block can be used as the representative value.

At the second stage, the block representative values obtained by the block representative value calculating circuit 1 are processed in the fluorescent lamp block average value calculating circuit 2, the solar/tungsten light block average value calculating circuit 3, the brightest block searching circuit 8 and the brightest block average value calculating circuit 9 through predetermined procedures, respectively.

In a fluorescent lamp block average value calculating circuit 2, block representative values included in a fluorescent lamp white signal area are selected based on the block representative values, and an average value and the number of the selected block representative values are obtained as a fluorescent lamp block average value and the number of fluorescent lamp blocks, respectively. FIG. 3 represents an example of the fluorescent lamp signal area in the DG-DI plane (the color-difference signal plane). The values of DG and DI axes are defined by $$DG=(2*G-R-B)/4 \qquad (a)$$

$$DI = (B-R)/2 \quad \text{(b)}$$

In this example, the block representative value (R, G, B) is converted to a point in the DG-DI plane by the above equations. When the converted point is included in the rectangular area shown in FIG. 3, the block corresponding to the point is selected as a block belonging to the fluorescent lamp white signal area. It can be also preferable to use another-shaped area suitable for a recording/reproducing apparatus or a subject to be imaged as the fluorescent lamp white signal area. The color-difference signal plane can be defined by equations other than the above (a) and (b).

Figure 4:
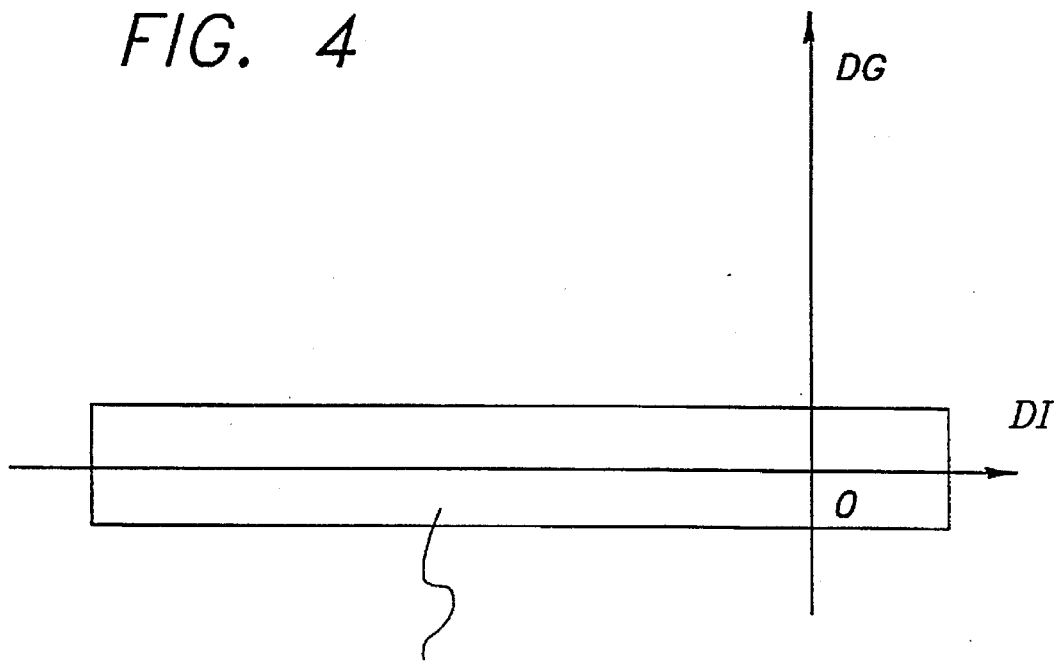
FIG. 4 shows a solar/tungsten light white signal area in the DG-DI plane.

The solar/tungsten light block average value calculating circuit 3 selects the block representative values belonging to a solar/tungsten light white signal area based on the block representative values, and obtains an average value of the selected block representative values (a solar/tungsten light block average value) and the number of the selected blocks (the number of the solar/tungsten light blocks). FIG. 4 represents an example of the solar/tungsten light white signal area in the DG-DI plane. The values of DG and DI axes in FIG. 4 are defined by the above equations (a) and (b). When the converted point is included in the rectangular area shown in FIG. 4, the block corresponding to the point is selected as a block belonging to the solar/tungsten light white signal area, as in FIG. 3.

The brightest block searching circuit 8 chooses the blocks the R, G, B components of which are larger than respective predetermined R, G and B threshold values, and selects a block having the highest luminance out of the chosen blocks as the brightest block in the image signal. The luminance L is defined by $$L = (2*G + R + B)/4$$

or by $$L = (6*G + 3*R + B)/10$$

In this embodiment, the luminance defined by an equation other than these above equations can be used.

The brightest block searching circuit 8 outputs the representative value of the brightest block (the brightest block representative value) obtained by the selection to the brightest block average value calculating circuit 9.

Figure 5:
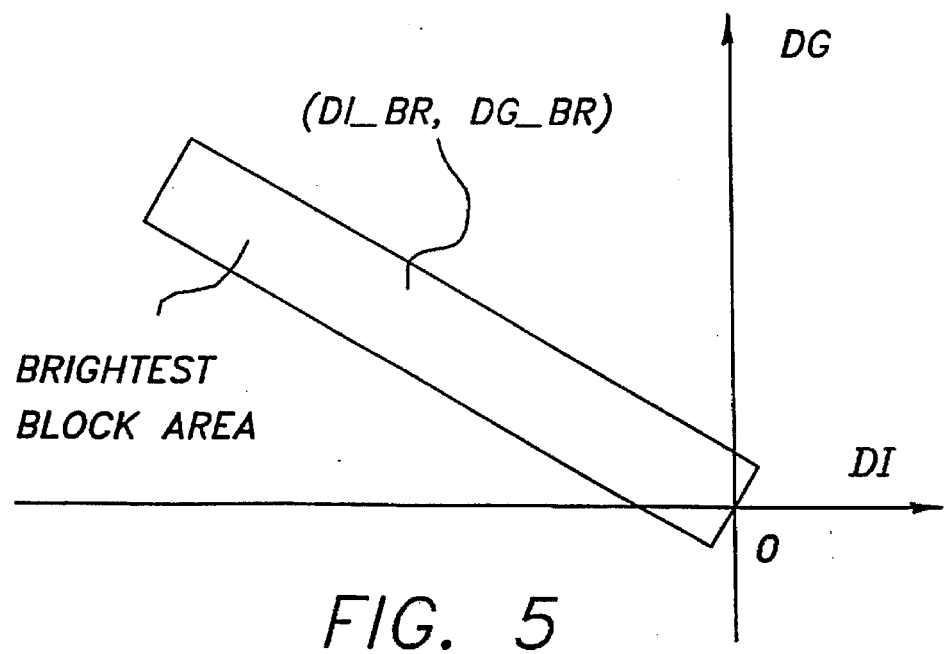
FIG. 5 shows a brightest block signal area in the DG-DI plane.

The brightest block average value calculating circuit 9 obtains a brightest block signal area based on the brightest block representative value inputted from the brightest block searching circuit 8. A method for obtaining the brightest block signal area is described by reference to FIG. 5. An inputted brightest block representative value is plotted in the DG-DI plane. The values (DI_BR, DG_BR) in the DG-DI plane are calculated from the values of the R, G and B components of the brightest block representative value by the equations (a) and (b). The line segment linking the origin and the point (DI_BR, DG_BR) is set in the DG-DI plane. A rectangular area including the line segment and having sides parallel to the line segment is defined as the brightest block signal area (FIG. 5). In this example, the length of the sides parallel to the line segment linking the origin and the point (DI_BR, DG_BR) is predetermined times as long as that of the line segment. The length of the sides perpendicular to the line segment is predetermined.

The brightest block signal area can be determined by another method than described above.

The brightest block average value calculating circuit 9 selects the block representative values belonging to the brightest block signal area based on the block representative values sequentially inputted from the block representative value calculating circuit 1, and obtains an average value of the selected block representative values (a brightest block average value) and the number of the selected blocks (the number of the brightest blocks).

At the third stage, further calculation processing is performed using the signal data obtained at the above two stages, such as the block average values and the number of blocks. The processing at the third stage is described below.

A subject luminance is inputted from a subject luminance input terminal of a fluorescent lamp block weighting circuit 4 simultaneously when the fluorescent lamp block average value and the number of the fluorescent lamp blocks are inputted to the fluorescent lamp block weighting circuit 4 from the fluorescent lamp block average value calculating circuit 2. The fluorescent lamp block weighting circuit 4 calculates a fluorescent lamp block weighting factor based on the inputted data through a predetermined procedure. A method for calculating this weighting factor is described below, where the subject luminance is denoted as BV, the fluorescent lamp block average value as (R F, G F, B F) and a saturation of the fluorescent lamp block average value as S F. The saturation S is defined by $$S = (DG*DG + DI*DI) \quad \text{(c)}$$

The DI and DG values for the fluorescent lamp block average value (R F, G F, B F) is obtained by the equations (a) and (b). The S F can be obtained by applying the above obtained DI and DG values to the equation (c).

According to this weighting factor determining method, a smaller fluorescent lamp block weighting factor W F is set up when the subject luminance is higher in order to prevent the color failure arising out of a white subject irradiated by a fluorescent lamp and green grass in sunlight. A high subject luminance indicates a bright subject, suggesting that the subject is in sunlight rather than irradiated by a fluorescent lamp. The image signals derived from green grass in sunlight are possibly included in the fluorescent lamp white signal area rather than those from a white subject irradiated by a fluorescent lamp. When the subject luminance is high, the effect of the white balance adjusting for the subject irradiated by a fluorescent lamp is required to be diminished by decreasing the fluorescent lamp block weighting factor, which weights the fluorescent lamp block average value, to a small value near zero. The fluorescent lamp block weighting factor can be determined using predetermined threshold values of BV0, BV1, BV2 and BV3 by the following rule:

(1) If BV<BV0, then W F=1.0
(2) If BV0≦BV<BV1, then W F=0.75
(3) If BV1≦BV<BV2, then W F=0.5
(4) If BV2≦BV<BV3, then W F=0.25
(5) If BV3≦BV, then W F=0.0
where BV0<BV1<BV2<BV3.

In the above rule, the W F is determined only based on the subject luminance BV. In another example, the saturation of the fluorescent lamp block average value S F is additionally adopted as a parameter. When the S F is sufficiently small, the fluorescent lamp block weighting factor is set at 1, irrespective of values of the subject luminance. The above rule is exemplified using a predetermined threshold value of S0 F as follows:

(1) If S F<S0 F, then W F=1.0
(2) If S F≧S0 F and BV<BV0, then W F=1.0
(3) If S F≧S0 F and BV0≦BV<BV1, then W F=0.75
(4) If S F≧S0 F and BV1≦BV<BV2, then W F=0.5
(5) If S F≧S0 F and BV2≦BV<BV3, then W F=0.25

(6) If S F≧S0 F and BV3≦BV, then W F=0.0

An example of the method for determining the fluorescent lamp block weighting factor has been described. The essence of this determining method is to set the fluorescent lamp block weighting factor W F at a small value when the subject luminance BV is high, and to set at 1, irrespective of values of the subject luminance when the saturation is sufficiently small. In addition, the fluorescent lamp block weighting factor can be set at a small value, irrespective of values of the BV when the saturation S F is very large. Instead of the above rule, the S F can be obtained using a specific function f (R F, G F, B F) of the variable fluorescent lamp block average value and subject luminance BV.

The fluorescent lamp block weighting factor W F obtained by this method enables the following: When the subject luminance BV is low, which suggests that the subject is possibly irradiated by a fluorescent lamp, the white balance adjusting removes the effect of the illumination with a fluorescent lamp. When the subject luminance BV is high, which suggests that the subject is possibly green grass in the solar light, the white balance adjusting relating to light of a fluorescent lamp is diminished.

The fluorescent lamp block weighting circuit 4 multiplies the fluorescent lamp block average value and the number of the fluorescent lamp blocks by the fluorescent lamp block weighting factor determined by the above method.

A solar/tungsten light block average value is inputted to the solar/tungsten light block weighting circuit 5. The solar/tungsten light block weighting circuit 5 determines a solar/tungsten light block weighting factor based on the inputted data through a predetermined procedure. An example of the method for determining the solar/tungsten light block weighting factor is described below.

The solar/tungsten light block average value is denoted as (R D, G D, B D), and a saturation of the solar/tungsten light block average value as S D. The saturation S D is obtained by the equation (c), as the aforementioned S F.

According to this determining method, the solar/tungsten light block weighting factor W D is set at a small value when the S D is large. The following rule using a predetermined threshold value of S0 D exemplifies this determining method:

(1) If S D<S0 D, then W D=1.0

(2) If S D≧S0 D, then W D=0.5

Another method for determining the solar/tungsten light block weighting factor W D can be adopted, rather than the above rule. For instance, W D can be obtained using a specific function f (R D, G D, B D) of the variable solar/tungsten light block average value (R D, G D, B D) instead of the above rule using the S D. The solar/tungsten light block weighting factor obtained according to this method prevents excessive adjustment of white balance when the human eye cannot be thoroughly adapted to the circumstances as in a sunset.

The solar/tungsten light block weighting circuit 5 multiplies the solar/tungsten light block average value and the number of the solar/tungsten light blocks by the solar/tungsten light block weighting factor determined by the above method.

A brightest block average value and the number of the brightest blocks are inputted to the brightest block weighting circuit 10 from the brightest block average value calculating circuit 9. The brightest block weighting circuit 10 obtains a brightest block weighting factor based on the inputted data through a predetermined procedure. An example of the method for calculating the brightest block weighting factor is described below.

The brightest block average value is denoted as (R B, G B, B B), and a saturation of the brightest block average value as S B. The saturation S B is obtained by the equation (c), as the S F.

This method for determining the brightest block weighting factor W B is determined by the following rule using predetermined threshold values of S0 B, S1 B:

(1) If S B <S0 B, then W B=1.0

(2) IF S0 B≦S B and (B B≧R B or 2*G B–R B–B B≦0), then W B=0.0

(3) If S0 B<S B≦S1B and (B B<R B and 2*G B–R B–B B>0), then W B=1.0

(4) IF S1 B<S B and (B B<R B and 2*G B–R B–B B>0), then W B=0.75 where S0 B<S1 B.

In this rule, the brightest block weighting factor W B is set at zero when B B≧R B or 2*G B–R B–B B≦0. The brightest block representative value satisfying the described conditions suggests that the image is possibly derived from the blue sky. Under these conditions, the white balance adjusting using a brightest block weighting factor of unity, which strongly reflects on the state of the brightest block, easily causes the color failure. The above described is an example of the methods for determining the brightest block weighting factor. The brightest block weighting factor can be appropriately determined depending on the conditions under which a recording/reproducing apparatus equipped with the device provided by the present invention is used, such as what light sources are mainly used, what subjects are mainly imaged.

The brightest block weighting circuit 10 multiplies the brightest block average value and the number of the brightest blocks by the weighting factor determined by the above method.

At the fourth stage, a white balance adjusting signal calculating circuit 6 performs a calculation for obtaining a white balance adjusting signal based on the weighting factors, the weighted average values and the weighted numbers of blocks inputted from the fluorescent lamp block weighting circuit 4, the solar/tungsten light block weighting circuit 5 and the brightest block weighting circuit 10.

The white balance adjusting signal calculating circuit 6 combines the weighted average values proportionally to the ratio of the weighted numbers of blocks in order to obtain the white balance adjusting signal. In this operation, a ratio of contribution of the fluorescent lamp blocks, the solar/tungsten light blocks and the brightest blocks to the white balance adjusting signal (a ratio of combination) is first obtained by $$M\ F = W\ F*CNT\ F/(W\ F*CNT\ F + W\ D*CNT\ D + W\ B*CNT\ B) \quad \text{(d)}$$

$$M\ D = W\ F*CNT\ D/(W\ F*CNT\ F + W\ D*CNT\ D + W\ B*CNT\ B) \quad \text{(e)}$$

$$M\ B = W\ F*CNT\ B/(W\ F*CNT\ F + W\ D*CNT\ D + W\ B*CNT\ B) \quad \text{(f)}$$

where M F, M D and M B are ratios of combination of the fluorescent lamp blocks, the solar/tungsten light blocks and the brightest blocks, respectively. CNT F, CNT D and CNT B are the numbers of the fluorescent lamp blocks, the solar/tungsten light blocks and the brightest blocks, respectively. The W*CNT in each above equation is a weighted number of the blocks. The ratio of combination is a ratio of the weighted number of the blocks of a light source (one out of the fluorescent lamp, the solar/tungsten light and the brightest light) to the number of all blocks.

A mixed signal (Rmix, Gmix, Bmix) is obtained based on the ratios of combination for the respective light sources by $$Rmix = M \; F*R \; F + M \; D*R \; D + M \; B*R \; B \quad (g)$$

$$Gmix = M \; F*G \; F + M \; D*G \; D + M \; B*G \; B \quad (h)$$

$$Mmix = M \; F*B \; F + M \; D*B \; D + M \; B*B \; B \quad (i)$$

The white balance adjusting signals of Radj and Badj are obtained based on the three components of the mixed signal by $$Radj = Gmix - Rmix$$

$$Badj = Gmix - Bmix$$

At the last (fifth) stage, an auto white balance adjusting circuit 7 adjusts the white balance for the inputted image signal using the white balance adjusting signal. The auto white balance adjusting circuit 7 adds the white balance adjusting signals of Radj and Badj to the R and B components of all image pixels, respectively in order to adjust the white balance.

Instead of using the above mentioned Radj and Badj, MAX–Ranix, MAX–Gmix and MAX–Bmix can be used as the white balance adjusting signals after obtaining MAX= max (Rmix, Gmix, Bmix). The operator max (a, b, . . . ) means selecting a maximum value out of all values in the parentheses.

In this embodiment, the white balance adjusting can be influenced by the image signal information of the brightest block. Consequently, the white balance adjusting can be appropriately applied to the image derived from a subject irradiated by a light source other than the predetermined ones.

In the second embodiment, the concept of uniformity of an image is introduced to reduce the color failure due to the images of chromatic-colored subjects, when the white balance of an image signal, a large part of which is derived from chromatic-colored subjects, is adjusted. The screen is divided into a plurality of regions. The blocks of the image signal are separated into several groups, in each of which the respective regions of the screen are included. The uniformity of each group is obtained. When the image of the group is substantially uniform, it is judged that most of the group is probably occupied by an image derived from a chromatic-colored subject. The white balance adjusting is not applied to the above group.

Figure 7:
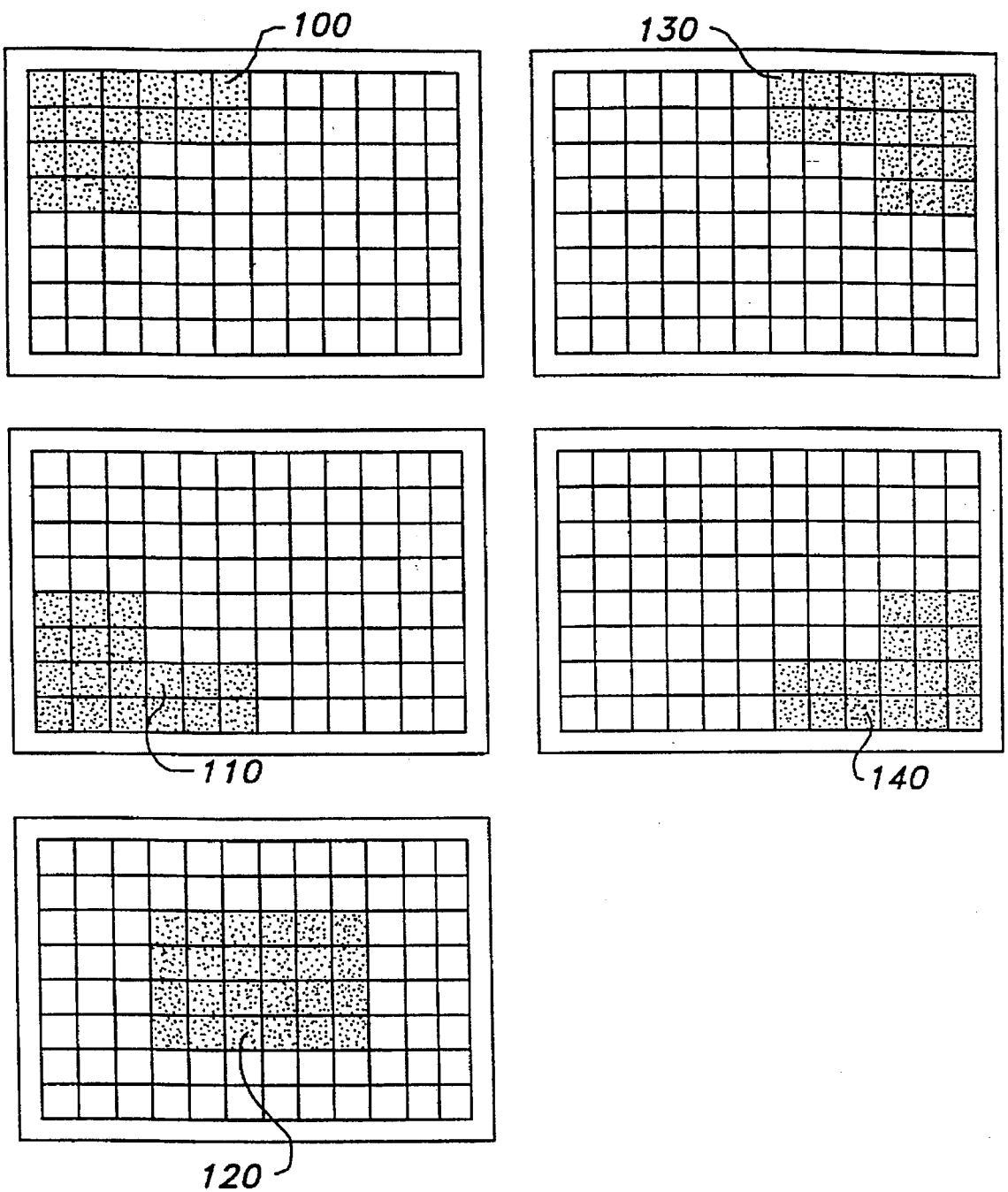
FIG. 7 represents a division of the screen to blocks according to the second embodiment of the present invention.

FIG. 7 exemplifies the grouping of the blocks of the image signal. In this embodiment, the screen is divided into a plurality of regions of 100, 110, 120, 130 and 140, as shown in FIG. 7. The regions correspond to the respective groups. The grouping method is not limited to this example.

The uniformities are obtained for the respective groups. The uniformity of the p-th group U (p) is defined by $$Ux\;(p) = \Sigma min \; \{Umax, (DI\;(i,j) - DI\;(i+1,j))^2 + (DG\;(i,j) - DG\;(i+1,j))^2\} \quad (j)$$

$$Uy\;(p) = \Sigma min \; \{Umax, (DI\;(i,j) - DI\;(i,j+1))^2 + (DG\;(i,j) - DG\;(i,j+1))^2\} \quad (k)$$

$$U\;(p) = Ux\;(p) + Uy\;(p) \quad (l)$$

where DI (i, j) and DG (i, j) mean the values of DI and DG at a position (i, j) (i, j: integer) of a block when the block is determined as shown in FIG. 7 and the position is defined by a matrix. Umax is a pre-determined constant. The operator min (a, b, . . . ) means selecting a minimum value out of all values in the parentheses.

The operator Σ in the above equation of Ux (p) means summing with respect to i and j when the blocks of (i, j) and (i+1, j) are included in the p-th Group. The operator Σ in the above equation of Uy (p) means summing with respect to i and j when the blocks of (i, j) and (i, j+1) are included in the p-th Group.

When the uniformity is defined by the above equations, the less difference between neighboring blocks, that is the more uniform, the smaller the uniformity U is.

The uniformity of a group is compared with a predetermined threshold value. When the uniformity U of the group is smaller than the threshold value, the group is judged to be uniform. The block representative values of the blocks included in the group judged to be uniform are not used for calculating the signal for the white balance adjusting. This results in the white balance adjusting in which the influence of uniform parts of the image is diminished.

Figure 6A:
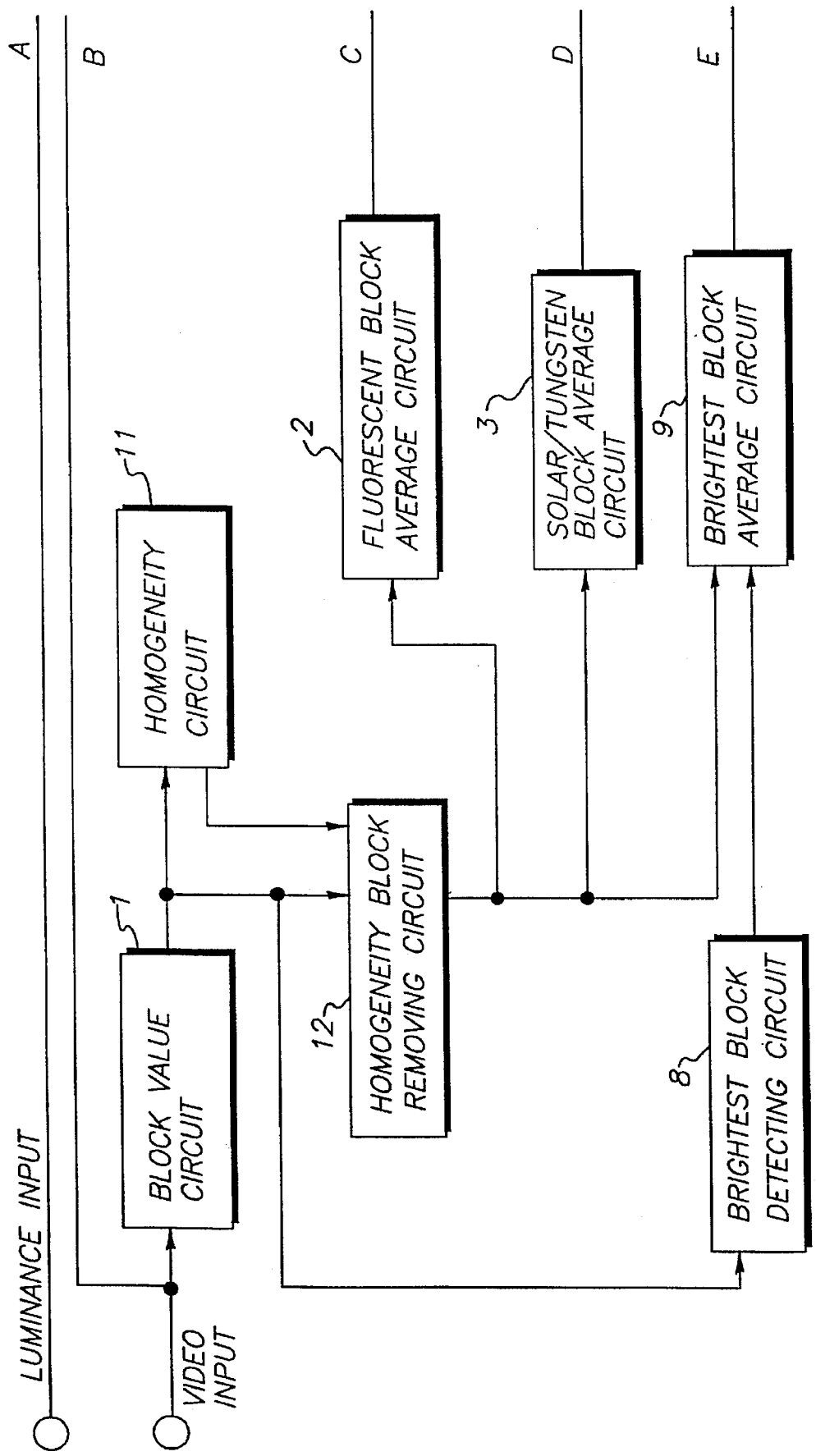
FIGS. 6A and 6B show a block diagram of an auto white balance adjusting device according to the second embodiment of the present invention.
Figure 6B:
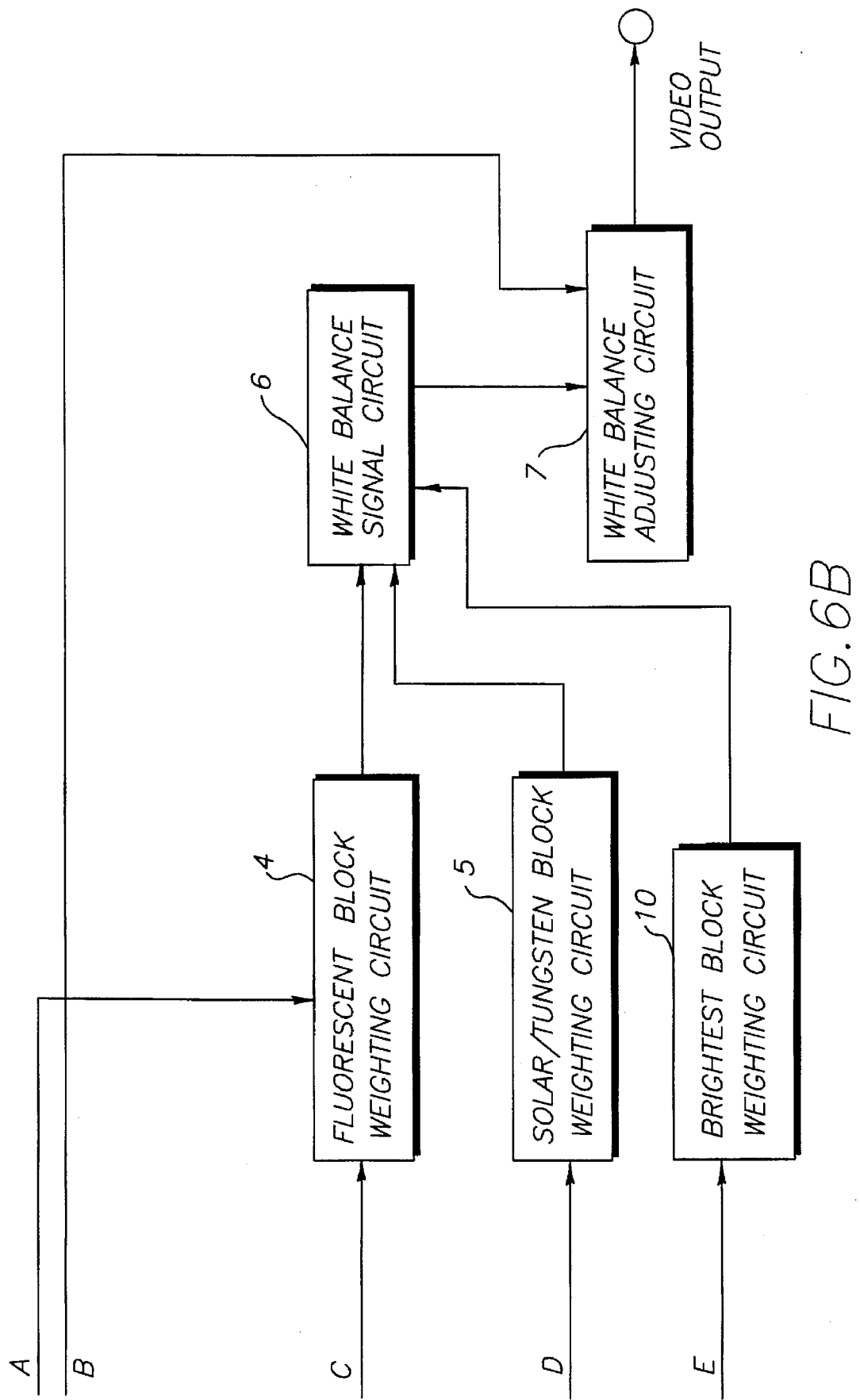

FIG. 6 is a block diagram showing the structure of an example according to the second embodiment. When an element shown in FIG. 6 has a function similar to that shown in FIG. 1, the same number is given to the element as that of the corresponding element in FIG. 1, then the description of the element is omitted.

The structure shown in FIG. 6 has a uniformity calculating circuit 11 and a uniform block eliminating circuit 12 in addition to the structure shown in FIG. 1. The block representative values are inputted from the block representative value calculating circuit 1 to the uniformity calculating circuit 11. The uniformity calculating circuit 11 separates the block representative values into a predetermined number of groups. The uniformity of the respective groups is calculated using the aforementioned equations (j), (k) and (l). The uniformity calculating circuit 11 compares the uniformity U of the respective groups with a predetermined threshold value. When the uniformity of a group is smaller than the threshold value, the number of the group or the information of the blocks belonging to the group is outputted to the uniform block eliminating circuit 12.

In this embodiment, the respective block representative values outputted from the block representative value calculating circuit 1 are inputted to the fluorescent lamp block average value calculating circuit 2, solar/tungsten light block average value calculating circuit 3 and brightest block average value calculating circuit 9 through the uniform block eliminating circuit 12. The uniform block eliminating circuit 12 eliminates the block representative values of the blocks belonging to a substantially uniform group based on the information from the uniformity calculating circuit in order to prevent the representative values of the blocks belonging to a substantially uniform group from being inputted to the fluorescent lamp block average value calculating circuit 2, solar/tungsten light block average value calculating circuit 3 and brightest block average value calculating circuit 9. In the other circuits, the calculation as shown in the first embodiment is subsequently carried out using the remaining block representative values. The white balance adjusting is carried out based on the above calculation.

Although the equations (j), (k) and (l) are used for obtaining the uniformity in the above description, the uniformity defined by other equations can be utilized in this embodiment. For instance, the equations shown below are usable for defining the uniformity.

$$Ux\;(p) = \Sigma min \; \{(DI\;(i,j) - DI\;(i+1,j))^2 + (DG\;(i,j) - DG\;(i+1,j))^2\}$$

$$Uy\;(p) = \Sigma \{(DI\;(i,j) - DI\;(i,j+1))^2 + (DG\;(i,j) - DG\;(i,j+1))^2\}$$

$$U\;(p) = Ux\;(p) + Uy\;(p)$$

In addition, the equations shown below is usable.

$$U_x(p) = \Sigma \text{sqrt}\{(DI(i,j)-DI(i+1,j))^2 + (DG(i,j)-DG(i+1,j))^2\}$$

$$U_y(p) = \Sigma \text{sqrt}\{(DI(i,j)-DI(i,j+1))^2 + (DG(i,j)-DG(i,j+1))^2\}$$

$$U(p) = U_x(p) + U_y(p)$$

In addition, the equations shown below is also usable.

$$U_x(p) = \Sigma\{|DI(i,j)-DI(i+1,j)|+|DG(i,j)-DG(i+1,j)|\}$$

$$U_y(p) = \Sigma\{|DI(i,j)-DI(i,j+1)|+|DG(i,j)-DG(i,j+1)|\}$$

$$U(p) = U_x(p) + U_y(p)$$

The uniformity of the group is also utilized in the third embodiment, as in the second. In the second embodiment, the substantially uniform groups are obtained based on the uniformity, and the block representative values of the blocks belonging to the substantially uniform groups are omitted so as not to be used for calculating a signal for the white balance adjusting. In contrast, the block representative values are ranked in this third embodiment based on their uniformities. The contribution of the block representative values to the white balance adjusting is decided according to the rank.

Figure 8A:
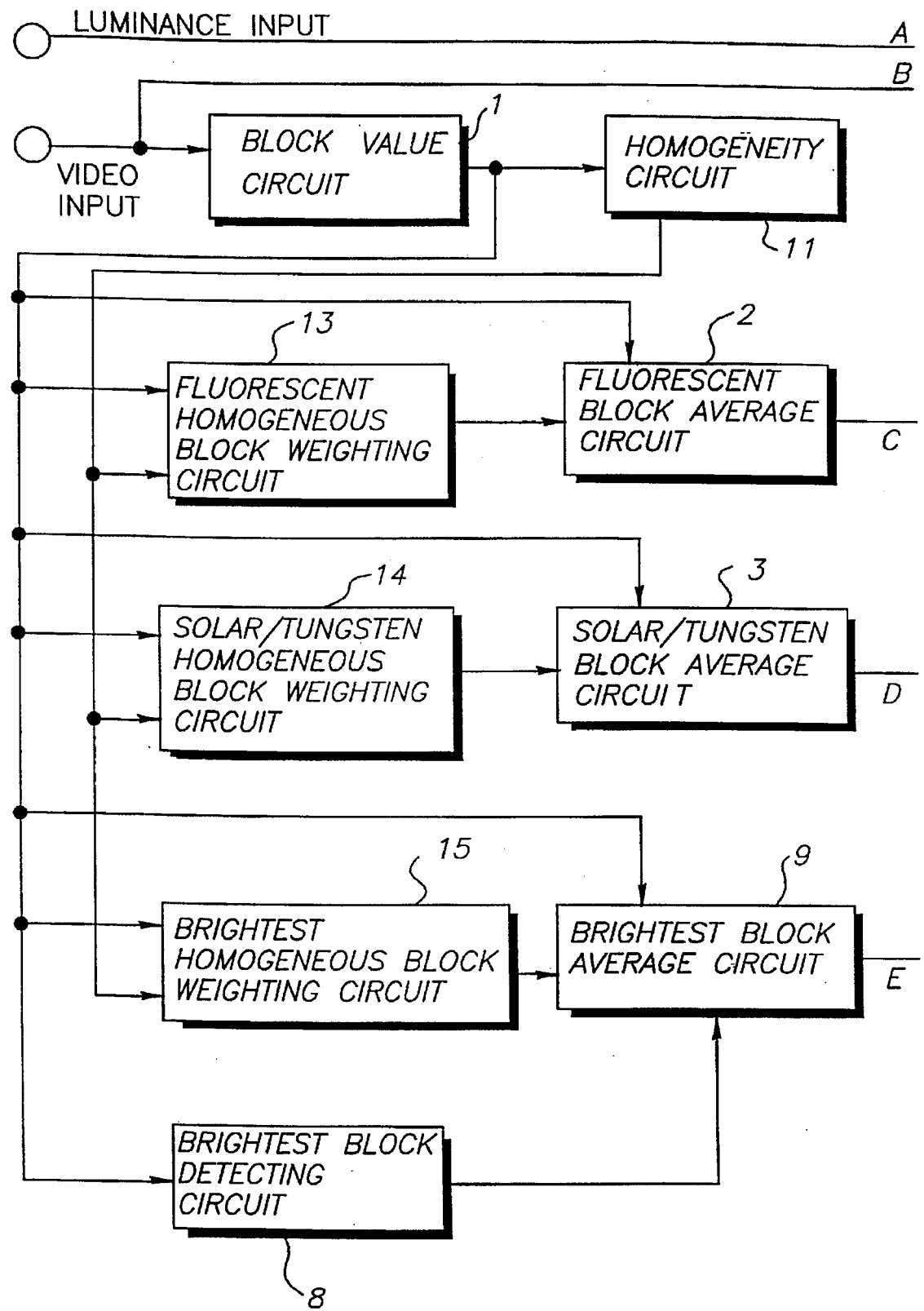
FIGS. 8A and 8B show a block diagram of an auto white balance adjusting device according to the third embodiment of the present invention.
Figure 8B:
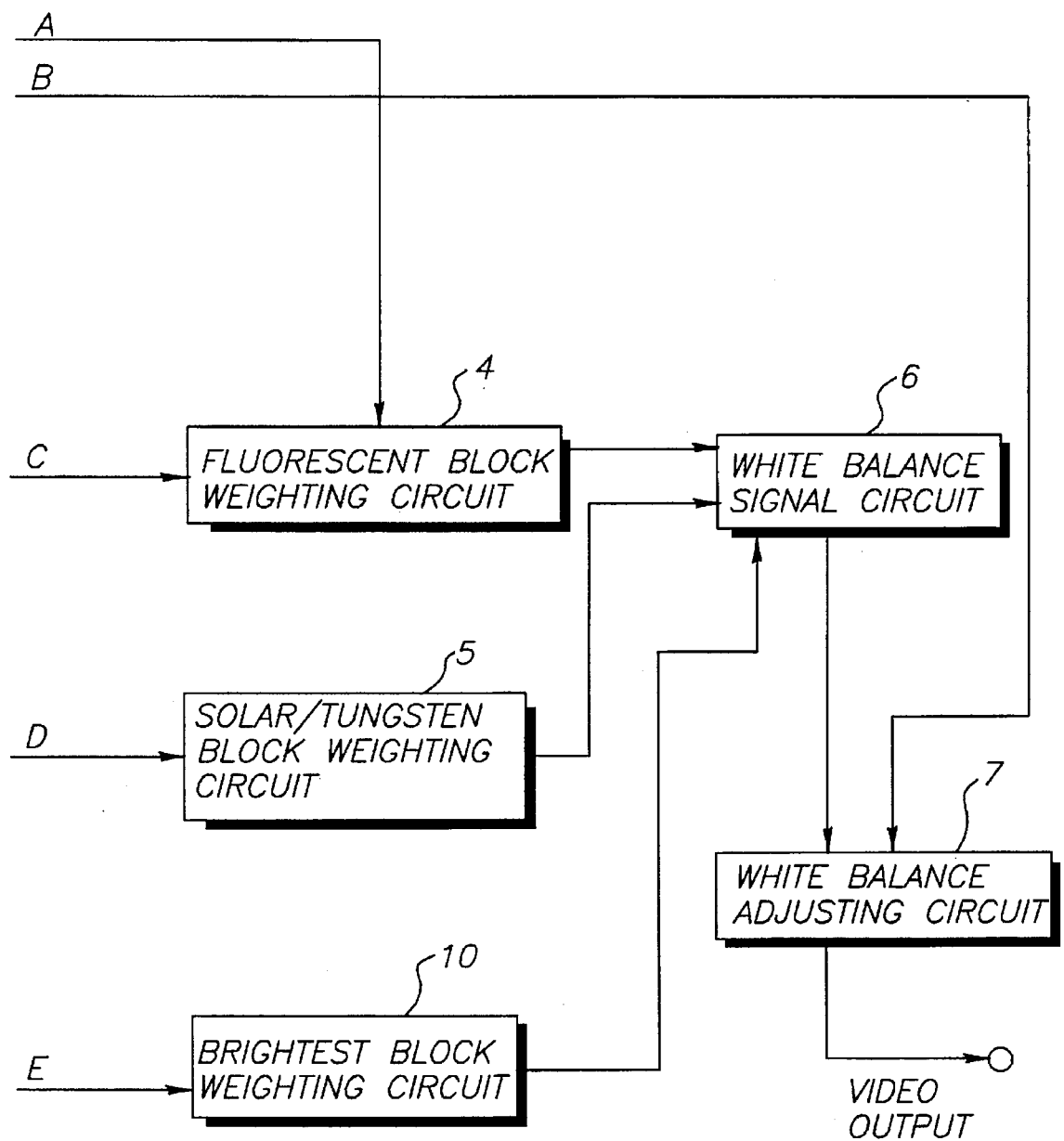

FIG. 8 is a block diagram showing an example of the structure according to the third embodiment. When an element shown in FIG. 8 has a function similar to that shown in FIG. 6, the same number is given to the element as that of the corresponding element in FIG. 6, then the description of the element is omitted.

In FIG. 8, the uniformity calculating circuit 11 obtains the uniformity U of the respective groups, and outputs the uniformity U of each group to a fluorescent lamp uniform block weighting circuit 13, solar/tungsten light uniform block weighting circuit 14 and brightest uniform block weighting circuit 15.

The fluorescent lamp uniform block weighting circuit 13, solar/tungsten light uniform block weighting circuit 14 and brightest uniform block weighting circuit 15 weight the block representative values inputted from the block representative value calculating circuit 1 based on the uniformity obtained by the uniformity calculating circuit 11. The more uniform a group is, that is, the lower the uniformity U that the group has, the smaller weighting factor is set on the group in this weighting. For instance, a uniform block weighting factor is defined by the following rule:

(1) If $U<U0$, then $UW=0.0$ (2) If $U0 \leq U<U1$, then $UW=0.25$ (3) If $U1 \leq U<U2$, then $UW=0.5$ (4) If $U2 \leq U<U3$, then $UW=0.75$ (5) If $U3 \leq U$, then $UW=1.0$ where $U0<U1<U2<U3$, and U0, U1, U2 and U3 mean predetermined threshold values, respectively.

The above described rule is only an example of the rules for defining the uniform block weighting factor. The block representative values can be weighted by the same or different rule among the fluorescent lamp uniform block weighting circuit 13, solar/tungsten light uniform block weighting circuit 14 and brightest uniform block weighting circuit 15.

The fluorescent lamp uniform block weighting circuit 13, solar/tungsten light uniform block weighting circuit 14 and brightest uniform block weighting circuit 15 multiply all the block representative values inputted from the block representative value calculating circuit 1 by the weighting factors calculated by the fluorescent lamp uniform block weighting circuit 13, solar/tungsten light uniform block weighting circuit 14 and brightest uniform block weighting circuit 15. The fluorescent lamp uniform block weighting circuit 13, solar/tungsten light uniform block weighting circuit 14 and brightest uniform block weighting circuit 15 then output the results to the fluorescent lamp block average value calculating circuit 2, solar/tungsten light block average value calculating circuit 3 and brightest block average value calculating circuit 9, respectively.

The fluorescent lamp block average value calculating circuit 2, solar/tungsten light block average value calculating circuit 3 and brightest block average value calculating circuit 9 calculate the respective average values of the blocks based on the weighted block representative values, as in the first embodiment. These average value calculating circuits need to select the blocks included in the fluorescent lamp white signal area or in the brightest block signal area when the respective block average values are calculated. The block representative values which are not weighted are used for the selection of the blocks. In this embodiment, the output from the block representative value calculating circuit 1 is inputted to the fluorescent lamp block average value calculating circuit 2, solar/tungsten light block average value calculating circuit 3 or brightest block average value calculating circuit 9.

In this embodiment, the white balance adjusting signal is obtained based on the block average values calculated from the weighted block representative values, as in the first embodiment.

According to this embodiment, the more uniform a group is, the smaller uniform block weighting factor is set on the group, leading to smaller contribution of the uniform groups to the white balance adjusting signal. This prevents the color failure for the image derived from a chromatic subject, and enables precise white balance adjusting appropriate to the image.

Figure 9A:
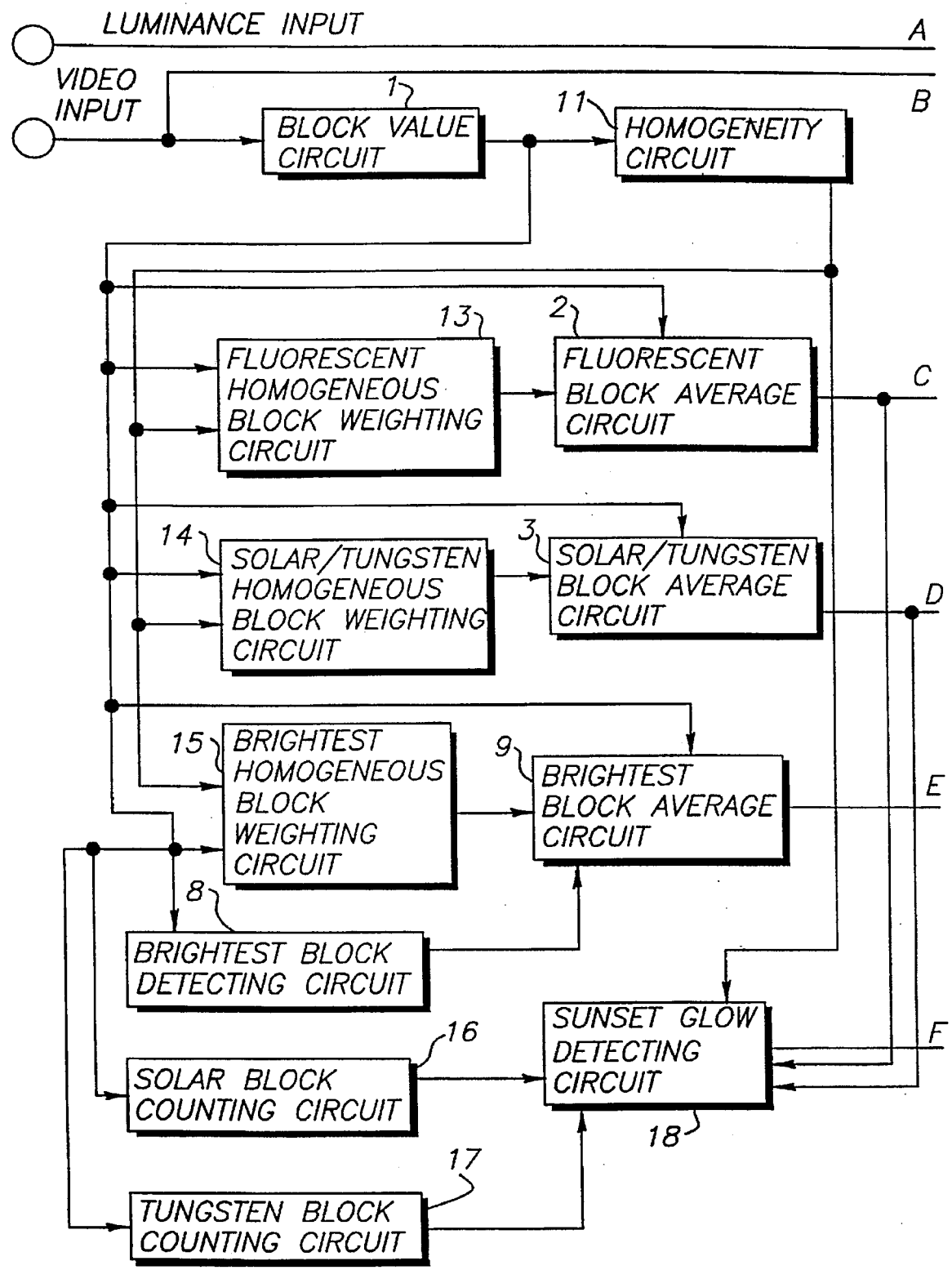
FIGS. 9A and 9B show a block diagram of an auto white balance adjusting device according to the fourth embodiment of the present invention.
Figure 9B:
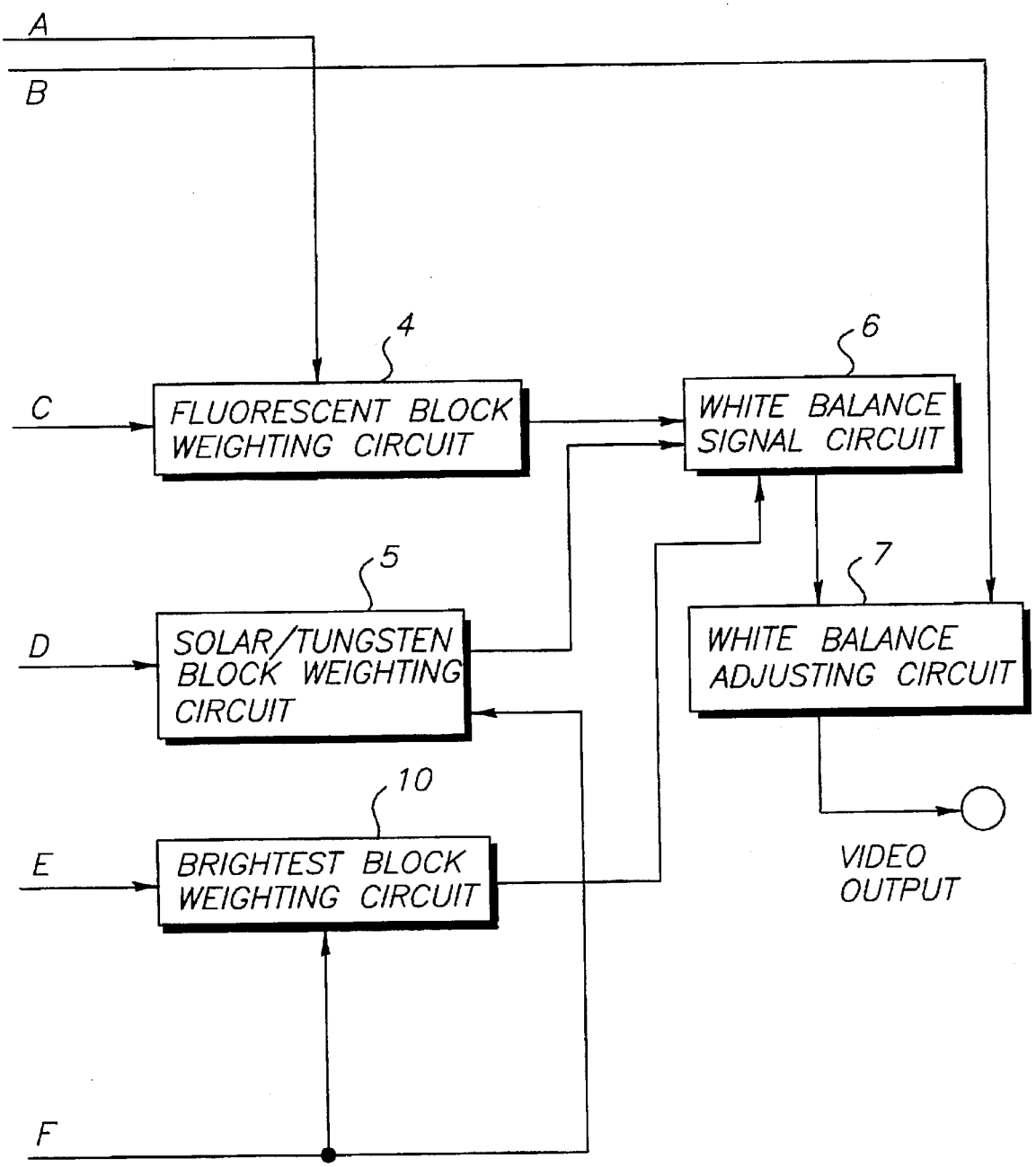
Figure 10:
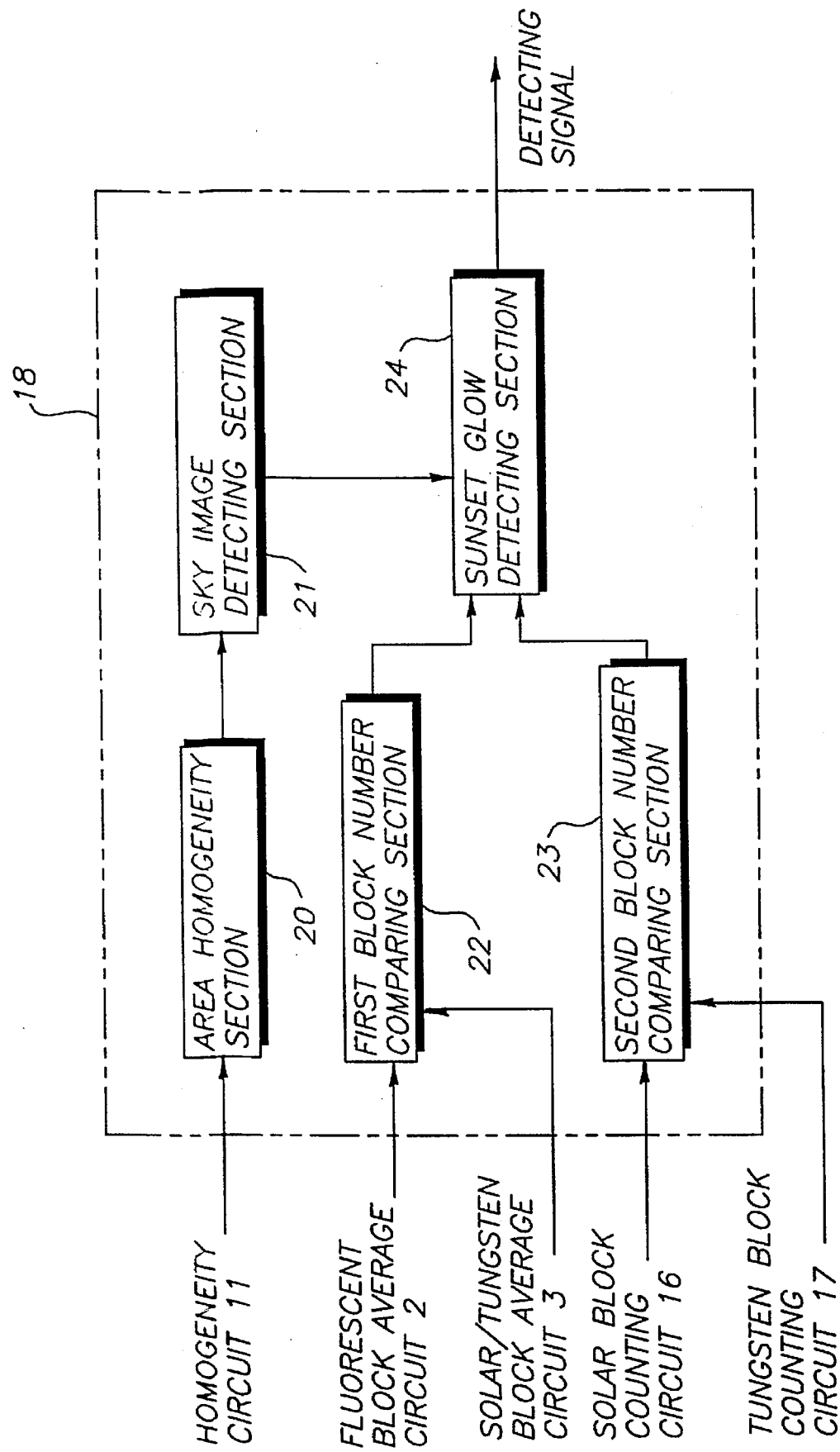
FIG. 10 shows a block diagram of the inner structure of a sunset determining circuit 18 according to the fourth embodiment.

The white balance of the image taken in a sunset is appropriately adjusted according to the fourth embodiment. In this embodiment, means for determining whether the image is taken in a sunset are added to the structure provided by the third embodiment. The white balance adjusting signal is controlled according to the decision made by the added means. FIG. 9 is a block diagram showing an example of the structure according to the fourth embodiment. When an element shown in FIG. 9 has a function similar to that shown in FIG. 6, the same number is given to the element as that of the corresponding element in FIG. 6, then the description of the element is omitted.

In FIG. 9, a signal is inputted from the uniformity calculating circuit 11, the fluorescent lamp block average value calculating circuit 2, the solar/tungsten light block average value calculating circuit 3, the solar light block number counting circuit 16 or the tungsten light block number counting circuit 17 to a sunset determining circuit 18.

Figure 11:
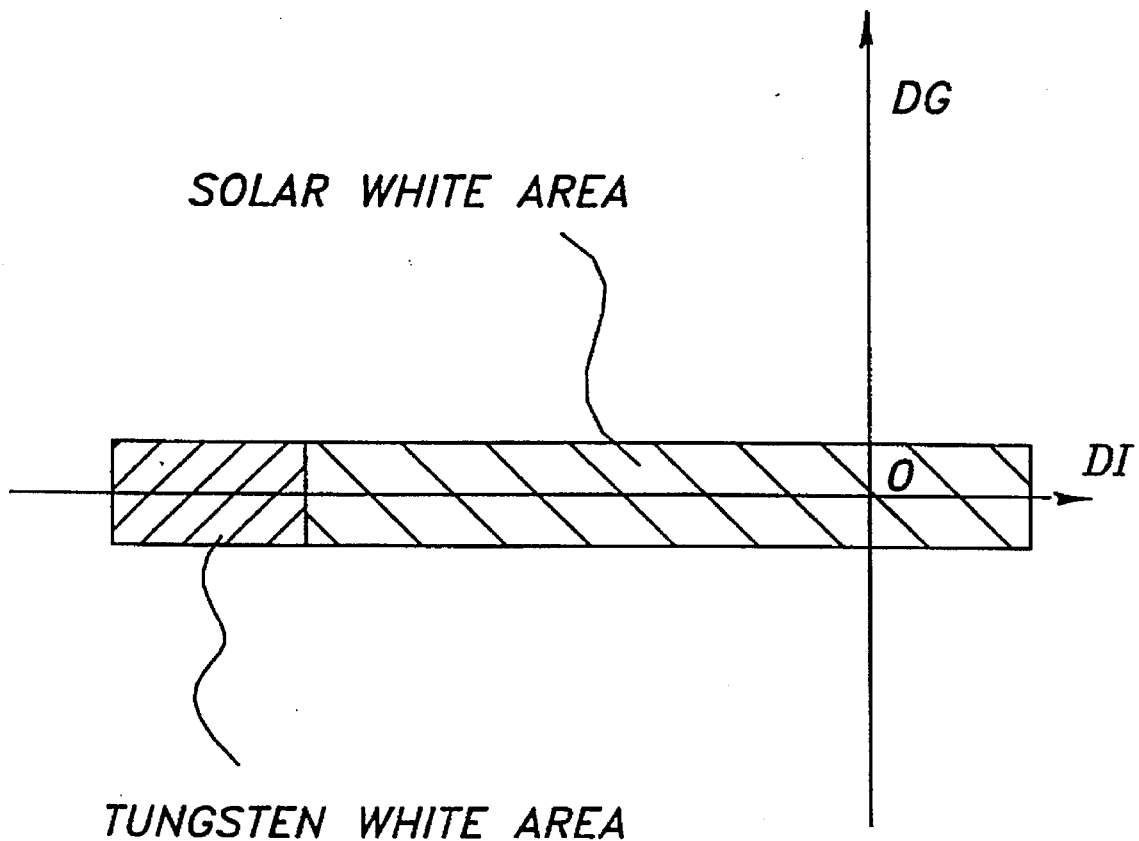
FIG. 11 shows solar and tungsten light white signal areas in the DG-DI plane.

The solar light block number counting circuit 16 and the tungsten light block number counting circuit 17 count the numbers of the blocks included in the solar light white signal area and in the tungsten light white signal area, respectively, after the block representative values are inputted from the block representative value calculating circuit 1. The solar and tungsten light white signal areas are defined as follows: An area around which the image signals from white subjects irradiated by sunlight or light of a tungsten lamp are distributed is defined as the solar or tungsten light white signal area. The solar and tungsten light white signal areas in the DG-DI plane are shown in FIG. 11. The sum of the solar and tungsten light white signal areas does not have to coincide with the solar/tungsten light white signal area defined before.

The sunset determining circuit 18 comprises a region uniformity calculating section 20, sky image detecting section 21, a first block number comparing section 22, a second block number comparing section 23 and a sunset image detecting section 24.

The region uniformity calculating section 20 calculates an upper, right and left uniformities based on the uniformities of the groups inputted from the uniformity calculating circuit 11. The screen is divided into upper, right and left regions. The upper uniformity is calculated through a predetermined procedure based on the uniformities of the groups included in the upper region. The right and left uniformities are calculated similarly to the upper uniformity. For instance, the sum or a maximum value of the uniformities of the groups belonging to the region can be used as the uniformity of the regions.

The obtained uniformities of the regions are inputted to the sky image detecting section 21. The sky image detecting section 21 determines whether the image signal is mainly derived from the sky based on the region uniformities. When at least one of the region uniformities are smaller than a predetermined threshold value, the region is uniform and the image displayed in the region is probably derived from the sky. The sky image detecting section 21 determines that the image is mainly derived from the sky when at least one of the region uniformities is smaller than the threshold value, and then outputs a signal indicating the determination.

The first block number comparing section 22 determines which influences the input image signal more, the illumination by a fluorescent lamp or by solar/tungsten light. The first block number comparing section 22 compares the number of the fluorescent lamp blocks inputted from the fluorescent lamp block average value calculating circuit 2 with that of the solar/tungsten light blocks inputted from the solar/tungsten light block average value calculating circuit 3, then outputs a result of the comparison.

The second block number comparing section 23 determines which influences the input image signal more, sunlight or light of a tungsten lamp. The second block number comparing section 23 compares the number of the solar light blocks inputted from the solar light block number counting circuit 16 with that of the tungsten light blocks inputted from the tungsten light block number counting circuit 17, then outputs a result of the comparison.

The sunset image detecting section 24 determines whether the input image signal is mainly derived from the sky in a sunset based on the signals inputted from the sky image detecting section 21, the first block number comparing section 22 and the second block number comparing section 23. The sunset image detecting section 24 judges that the input image signal is derived from the sky in a sunset, and outputs a sunset signal when the sky image detecting section 21 has judged that the input image signal is mainly derived from the sky, the first block number comparing section 22 has judged that the number of solar/tungsten light blocks is larger than that of fluorescent lamp blocks, and the second block number comparing section 23 has judged that the number of solar light blocks is larger than that of tungsten light blocks.

This sunset signal is inputted to the solar/tungsten light block weighting circuit 5 and brightest block weighting circuit 10.

The solar/tungsten light block weighting circuit 5 and brightest block weighting circuit 10 calculate the solar/tungsten light block and brightest block weighting factors, respectively, basically in the same manner as in the first embodiment. In this embodiment, these circuits additionally have the function of changing the weighting factors according to the inputted sunset signal.

When the solar/tungsten light block weighting circuit 5 receives the sunset signal indicating that the image is derived from the sky in a sunset, the solar/tungsten light block weighting circuit 5 changes the solar/tungsten light block weighting factor W D into zero or a value near zero in order to remove the influence of the image derived from the sky on the white balance adjusting. With respect to the solar/tungsten light block average value, a white balance adjusting signal is calculated using the changed solar/tungsten light block weighting factor.

The brightest block weighting circuit 10 has the function of changing the brightest block weighting factor according to the sunset signal inputted the brightest block weighting circuit 10. In this embodiment, it is determined which the brightest block average value inputted from the brightest block average value calculating circuit 9 is more close to, the fluorescent lamp white signal area or the solar/tungsten light white signal area. The brightest block weighting factor is changed according to the determination. For instance, the more close to the solar/tungsten light white signal area the brightest block average value is, the smaller value the brightest block weighting factor is made.

An example of the determination of which the brightest block average value is more close to, the fluorescent lamp white signal area or the solar/tungsten light white signal area is shown hereafter. The DI B and DG B are obtained by putting the brightest block average value (R B, G B, B B) into the equations (a) and (b). When the obtained DI B is less than zero and the obtained DGB is less than −DI B, the brightest block average value is judged to be close to the fluorescent lamp white signal area. Otherwise, the brightest block average value is judged to be close to the solar/tungsten light white signal area.

The brightest block weighting circuit 10 makes the brightest block weighting factor a not very small value when the brightest block average value is found to be close to the fluorescent lamp white signal area. The brightest block weighting circuit 10 changes the brightest block weighting factor into a very small value near zero when the brightest block average value is found to be close to the solar/tungsten light white signal area.

The influence of blocks having a chromaticity close to the brightest block on the white balance adjusting can be reduced by changing the brightest block weighting factor when the brightest block has a chromaticity close to the solar light. This enables white balance adjusting more appropriate to a subject to be imaged. The sunset detecting circuit 18 is applied to the structure according to the third embodiment (FIG. 8), resulting in a structure shown in FIG. 9. The sunset detecting circuit 18 can be applied to the structures according to the first and second embodiments.

Figure 12A:
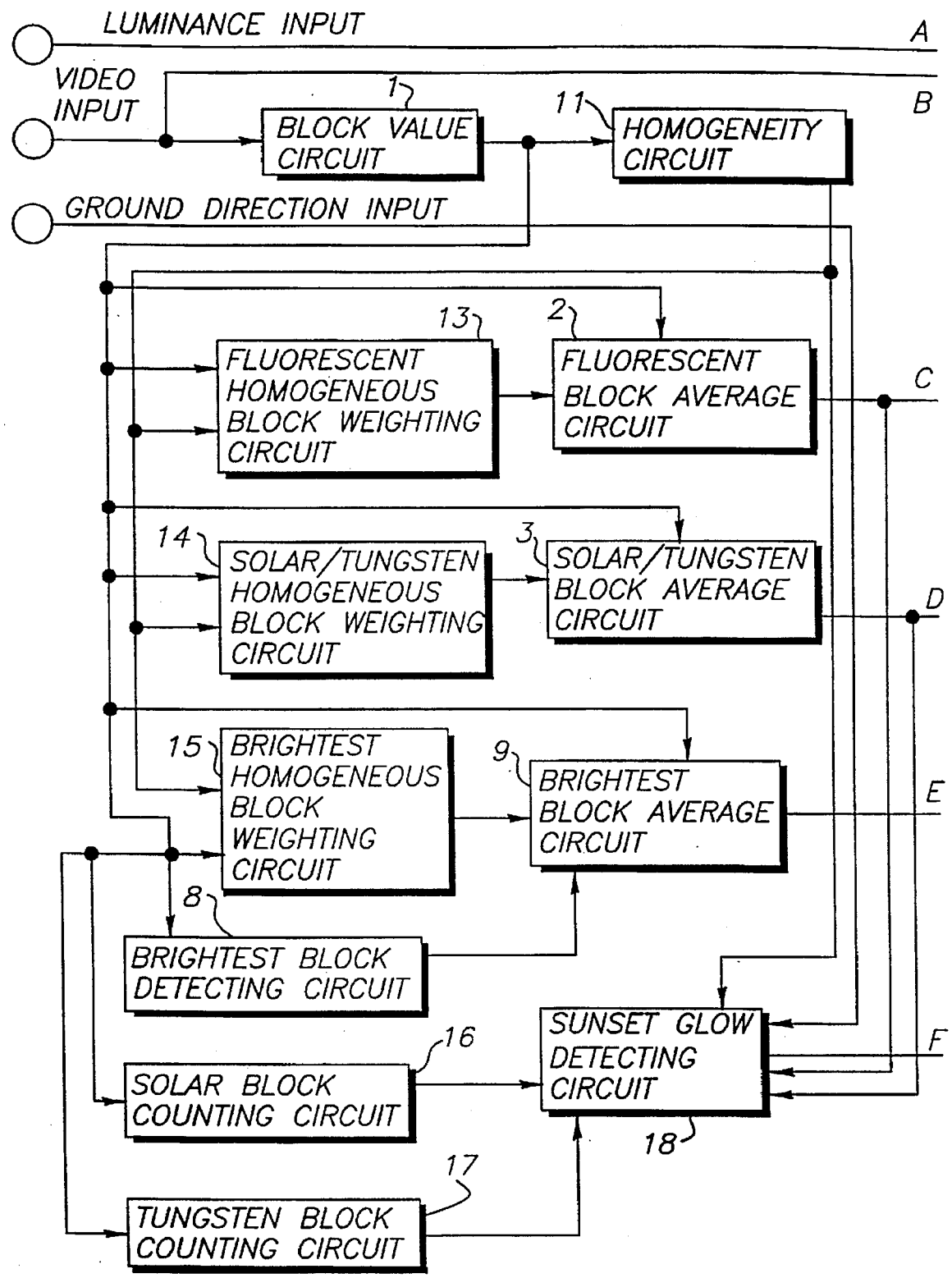
FIG. 12 shows a block diagram of a modified auto white balance adjusting device according to the fourth embodiment of the present invention.
Figure 12B:
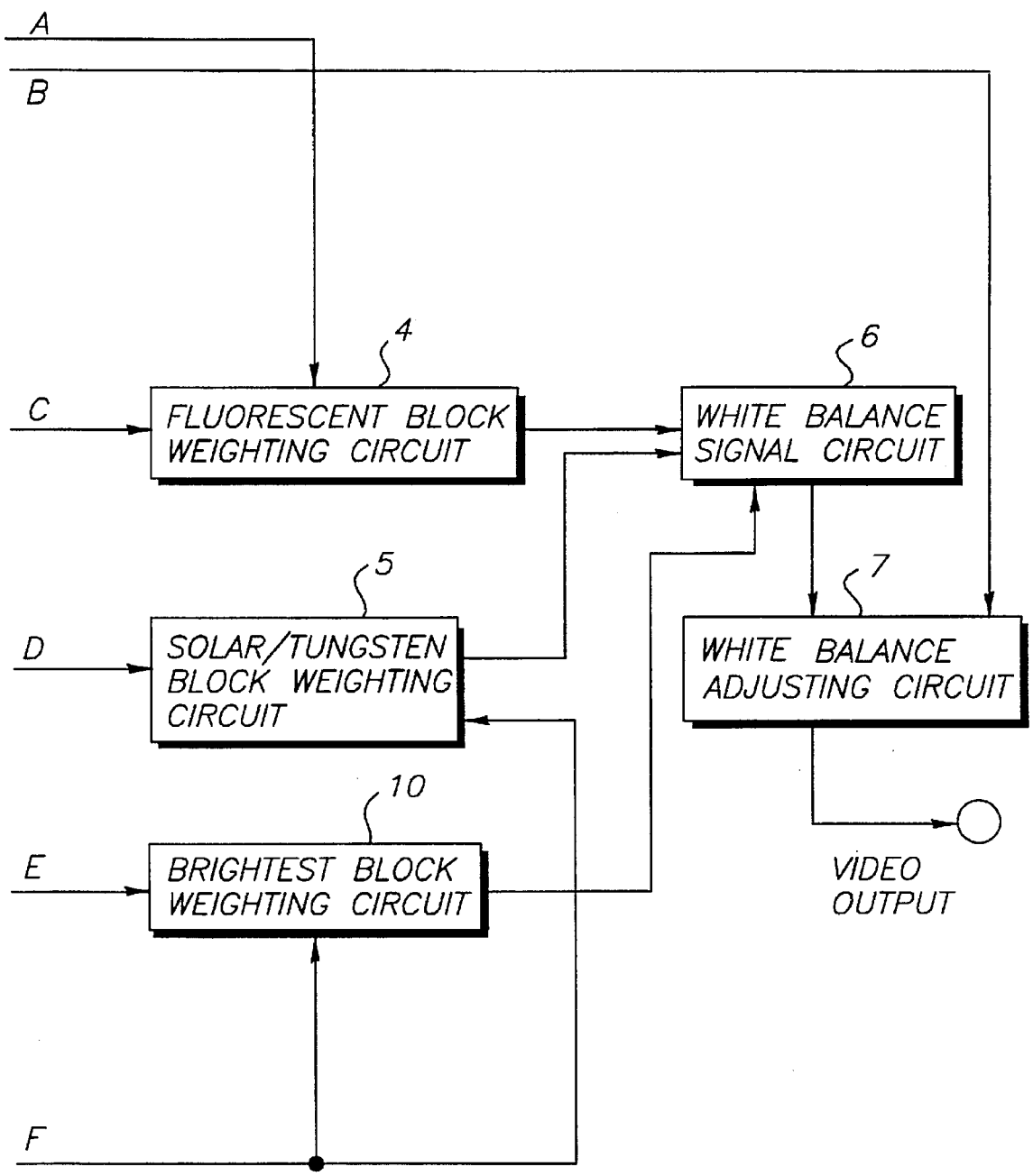

A modified example according to the fourth embodiment is shown in FIG. 12. In the structure shown in FIG. 12, a direction of the ground in the screen can be inputted to render the judgment by the sky image detecting section 21 more rapid and precise. When an element shown in FIG. 12 has a function similar to that shown in FIG. 9, the same number is given to the element as that of the corresponding element in FIG. 6, then the description of the element is omitted.

In the structure shown in FIG. 12, a ground direction signal inputted from a ground direction input terminal is introduced to the sunset determining circuit 18. When a user inputs the direction of the ground in the screen through means for inputting the direction of the ground (not shown in FIG. 12), a signal indicating the direction of the ground is inputted to the sunset determining circuit 18 via the ground direction input terminal.

The sunset determining circuit 18 judges a region located opposite to the inputted direction of the ground to be in the direction of the sky. The ground direction signal is inputted to the sky image detecting section 21. The sky image detecting section 21 determines whether the image which is judged to be in the direction of the sky by the ground direction signal is mainly derived from the sky by comparing the uniformity of the region located in the direction with a predetermined threshold value. The other calculations in this modified example performed as those in FIG. 9.

In this modified example, mean for inputting the direction of the ground is added. The determination of whether a part showing the sky is large out of the image signal can be more appropriately and rapidly made.

As described above, white balance adjusting appropriate to respective illumination sources can be achieved according to the present invention even when subjects are irradiated by plural illumination sources or by illumination sources which are not predetermined, as well as by a fluorescent lamp or by the solar light.

According to the present invention, the white balance adjusting in which the color failure is reduced can be further achieved by diminishing the contribution of a uniform part of the image when a large part of the image signal is derived from chromatic subjects.

According to the present invention, the white balance for an image taken in a sunset is prevented from overadjusting to make the image vivid by removing the influence of a sunset-colored part of the image on the white balance adjusting when the image is mainly derived from the sky in a sunset.

According to the present invention, the determination of whether a part showing the sky is large out of the image signal can be more appropriately and rapidly made to realize a more appropriate and rapid judgment on a sunset by pointing out the direction of the ground in the screen.

Parts List

1 Block representative value calculating circuit
2 Fluorescent lamp block average value calculating circuit
3 Solar/tungsten light block average value calculating circuit
4 Fluorescent lamp block weighting circuit
5 Solar/tungsten light block average value calculating circuit
6 White balance adjusting signal calculating circuit
7 White balance adjusting circuit
8 Brightest block searching circuit
9 Brightest block average value calculating circuit
10 Brightest block weighting circuit
11 Uniformity calculating circuit
12 Uniformity block removing circuit
13 Fluorescent lamp homogeneous block weighting circuit
14 Solar/tungsten light uniform block weighting circuit
15 Brightest uniform block weighting circuit
16 Solar light block number counting circuit
17 Tungsten light block number counting circuit
18 Sunset determining circuit
20 Region uniformity calculating section
21 Sky image detecting section
22 First block number comparing section
23 Second block number comparing section
24 Sunset image detecting section

What is claimed is:

1. An auto white balance adjusting device comprising:
   a block representative value calculating circuit for dividing an input image signal into blocks, and for obtaining a block representative value of the respective blocks representing the image signal;

a brightest block searching circuit for searching the blocks having the representative values the respective R, G, B components of which are greater than predetermined threshold R, G, B values, and for determining a block having the brightest luminance among the searched blocks as the brightest block;

a brightest block average value calculating circuit for obtaining a brightest block signal area, based on the block representative value of the brightest block determined by the brightest block searching circuit, for selecting block representative values belonging to the blocks of the brightest block signal area, for obtaining the number of the selected block representative values as the number of the brightest blocks, and for obtaining the average value of the selected block representative values as a brightest block average value;

a fluorescent lamp block average value calculating circuit for obtaining a fluorescent lamp white signal area, for selecting block representative values of the blocks belonging to the fluorescent lamp white signal area, for obtaining the number of the selected block representative values as the number of fluorescent lamp blocks, and for obtaining the average value of the selected block representative values as a fluorescent lamp block average value;

a solar/tungsten light block average value calculating circuit for obtaining a solar/tungsten light white signal area, for selecting block representative values of the blocks belonging to the solar/tungsten light white signal area, for obtaining the number of the determined block representative values as the number of the solar/tungsten light blocks, and for obtaining the average value of the determined block representative values as the solar/tungsten light block average value;

a brightest block weighting circuit for determining a brightest block weighting factor based on the brightest block average value through a predetermined procedure, and for obtaining a weighted brightest block average value by multiplying the brightest block average value by the brightest block weighting factor;

a fluorescent lamp block weighting circuit for determining a fluorescent lamp block weighting factor, based on at least one of the fluorescent lamp block average value or a subject luminance and for obtaining a weighted fluorescent lamp block average value by multiplying the fluorescent lamp block average value by the fluorescent lamp block weighting factor;

a solar/tungsten light block weighting circuit, for determining a solar/tungsten light block weighting factor based on the solar/tungsten light block average value through a predetermined procedure, and for obtaining a weighted solar/tungsten light block average value by multiplying the solar/tungsten light block average value by the solar/tungsten light block weighting factor;

a white balance adjusting signal calculating circuit for generating a white balance adjusting signal by combining the weighted brightest block average value, the weighted fluorescent lamp block average value and the weighted solar/tungsten light block average value proportionally to the ratio of the numbers of the blocks each number of which is weighted by the respective weighting factors; and a white balance adjusting circuit for adjusting the white balance of an image signal using the white balance adjusting signal.

2. An auto white balance adjusting device in accordance with claim 1 further comprising:
- a uniformity calculating circuit for calculating a uniformity of respective groups into which all blocks are divided based on the block representative values of the blocks belonging to each group; and
- a uniform block eliminating circuit for obtaining a substantially uniform group by comparing the uniformities of the groups outputted from the uniformity calculating circuit with a predetermined threshold value and for preventing the block representative values of the blocks belonging to the substantially uniform group from being inputted to the respective brightest, fluorescent lamp, and solar/tungsten light block average value calculating circuits from the block representative value calculating circuit in order to perform white balance adjusting based on the block representative values of the blocks belonging to the groups except the substantially uniform groups.

3. An auto white balance adjusting device in accordance with claim 1 further comprising:
- a uniformity calculating circuit for calculating a uniformity of respective groups into which all blocks are divided based on the block representative values of the blocks belonging to each group;
- a brightest uniform block weighting circuit for weighting the block representative values outputted from the block representative value calculating circuit with a brightest block weighting factor determined through a predetermined procedure depending on the uniformity and for outputting a weighted block representative value to the brightest block average value calculating circuit;
- a fluorescent lamp uniform block weighting circuit for weighting the block representative values outputted from the block representative value calculating circuit with a fluorescent lamp block weighting factor determined through a predetermined procedure depending on the uniformity and for outputting a weighted block representative value to said fluorescent lamp block average value calculating circuit; and
- a solar/tungsten light uniform block weighting circuit for weighting the block representative values outputted from the block representative value calculating circuit with a solar/tungsten light uniform block weighting factor determined through a predetermined procedure depending on the uniformity and for outputting a weighted block representative value to the solar/tungsten light block average value calculating circuit in order to obtain the brightest block average value, fluorescent lamp block average value and solar/tungsten light block average value by the respective brightest, fluorescent lamp, and solar/tungsten light block average value calculating circuits using the weighted block representative values outputted from the respective uniform block weighting circuits.

4. An auto white balance adjusting device in accordance with claim 2 further comprising:
- a solar light block number counting circuit for obtaining the number of blocks the block representative values of which are included in a solar light white signal area;
- a tungsten light block number counting circuit for obtaining the number of blocks the block representative values of which are included in a tungsten light white signal area; and a sunset determining circuit for determining whether the image signal is derived from a sunset,
- the sunset determining circuit having an region uniformity calculating section to which the uniformities of the groups are inputted, and by which an upper uniformity is obtained using the inputted uniformities in a predetermined upper region of a screen corresponding to the input image signal, a right uniformity in a predetermined right region of the screen and a left uniformity in a predetermined left region of the screen,
- a sky image detecting section for comparing the upper, right and left uniformities with a predetermined threshold value, and for determining that most of the image of the input signal shows the sky when at least one of the upper, right and left regions is found to be substantially uniform,
- a first block number comparing section for comparing the number of blocks inputted from the solar/tungsten light block average value calculating circuit with the number of blocks inputted from the fluorescent light block average value calculating circuit,
- a second block number comparing section for comparing the number of the solar light blocks with the number of the tungsten light blocks,
- a sunset image detecting section for determining whether the image signal is derived from the sky in a sunset, and for outputting a sunset determining signal to the solar/tungsten light block weighting circuit and the brightest block weighting circuit when the image is found to be derived from the sky by the sky image detecting section, the number of the tungsten light blocks is found to be larger by the comparison in the first block number comparing section and the solar block number is found to be larger by the comparison in the second comparing section, so that the brightest block weighting circuit generates different weighting factors when the brightest block average value is near the area of the fluorescent light white signal area or near the solar/tungsten light white signal area.

5. An auto white balance adjusting device in accordance with claim 4 wherein the sunset determining circuit obtains the upper, right and left uniformities by summing the uniformities of the groups included in the respective upper, right and left regions.

6. An auto white balance adjusting device in accordance with claim 4 wherein the sunset determining circuit obtains the upper, right and left uniformities from a maximum uniformity of the groups included in the respective upper, right and left regions.

7. An auto white balance adjusting device in accordance with claim 4 wherein the solar/tungsten light block weighting circuit changes the solar/tungsten light block weighting factor into zero when the solar/tungsten light block weighting circuit receives the sunset determining signal.

8. An auto white balance adjusting device in accordance with claim 7 wherein the brightest block weighting circuit decreases the brightest block weighting factor with the closer approach of the brightest block average value to the solar/tungsten light white signal area than to the fluorescent lamp white signal area.

9. An auto white balance adjusting device in accordance with claim 4 further comprising:
- means for inputting the direction of the ground in the screen, the sky image detecting section of the sunset determining circuit judging the image represented by the input image signal to mostly show the sky when only the region opposite to the direction of the ground inputted from the means for inputting the direction of the ground is substantially uniform.

10. An auto white balance adjusting device comprising:

a block representative value calculating circuit for dividing an input image signal into blocks, and for obtaining a block representative value of the respective blocks representing the image signal;

a brightest block searching circuit for searching the blocks having the representative values the respective R, G, B components of which are greater than predetermined threshold R, G, B values, and for determining a block having the brightest luminance among the searched blocks as the brightest block;

a brightest block average value calculating circuit for obtaining a brightest block signal area, based on the block representative value of the brightest block determined by the brightest block searching circuit, for selecting block representative values belonging to the blocks of the brightest block signal area, for obtaining the number of the selected block representative values as the number of the brightest blocks, and for obtaining the average value of the selected block representative values as a brightest block average value and a white balance adjusting circuit for adjusting the white balance of the image signal by using the brightest block average value.

11. An auto white balance adjusting device in accordance with claim 10 further comprising:

a brightest block weighting circuit for determining a brightest block weighting factor based on the brightest block average value through a predetermined procedure, and for obtaining a weighted brightest block average value by multiplying the brightest block average value by the brightest block weighting factor, wherein the weighted brightest block average value is used by the white balance adjusting circuit.

* * * * *

UNITED STATES PATENT AND TRADEMARK OFFICE
CERTIFICATE OF CORRECTION

PATENT NO. : 5,659,357
DATED : August 19, 1997
INVENTOR(S) : Toshiki Miyano

It is certified that error appears in the above-identified patent and that said Letters Patent is hereby corrected as shown below:

| | |
|---|---|
| Column 12, equation (e) | --M D= W D*CNT D/(W F*CNT F+W D*CNT D+W B*CNT B) -- |
| Column 12, equation (f) | -- M B=W B*CNT B/(W F*CNT F+W D*CNT D+W B*CNT B) -- |
| Column 13, equation (i) | -- Bmix=M F*B F+M D*B D+M B*B B -- |
| Column 13, line 10 | --Radj=Gmix-Rmix-- |
| Column 13, line 21 | -- MAX-Rmix-- |
| Column 14, line 63 | -- Ux (p)= $\sum\{(DI (i,j)-DI (i+1, j))^2+(DG (i,j)$-DG(i+1, j)$)^2\}$-- |

Signed and Sealed this

Twenty-third Day of December, 1997

Attest:

BRUCE LEHMAN

*Attesting Officer*      *Commissioner of Patents and Trademarks*